United States Patent
Jiang

(10) Patent No.: US 12,401,314 B2
(45) Date of Patent: Aug. 26, 2025

(54) SOLAR TRACKER

(71) Applicant: Hangzhou Sino-Deutsche Power Transmission Equipment Co., Ltd., Zhejiang (CN)

(72) Inventor: Li Jiang, Zhejiang (CN)

(73) Assignee: Hangzhou Sino-Deutsche Power Transmission Equipment Co., Ltd, Hangzhou (CN)

( * ) Notice: Subject to any disclaimer, the term of this patent is extended or adjusted under 35 U.S.C. 154(b) by 70 days.

(21) Appl. No.: 18/207,164

(22) Filed: Jun. 8, 2023

(65) Prior Publication Data

US 2023/0336113 A1    Oct. 19, 2023

Related U.S. Application Data

(63) Continuation of application No. PCT/CN2021/125982, filed on Oct. 25, 2021.

(30) Foreign Application Priority Data

| Dec. 8, 2020 | (CN) | ......................... 202011423316.3 |
| Jan. 29, 2021 | (CN) | ....................... 202110124983.X |
| Mar. 23, 2021 | (CN) | ......................... 202110306266.9 |
| May 24, 2021 | (CN) | ......................... 202110566999.6 |

(51) Int. Cl.
  *H02S 20/32* (2014.01)
  *F16H 1/16* (2006.01)
  *F16H 57/021* (2012.01)

(52) U.S. Cl.
  CPC ............... *H02S 20/32* (2014.12); *F16H 1/16* (2013.01); *F16H 2057/0213* (2013.01)

(58) Field of Classification Search
  CPC ..... H02S 20/32; F16H 1/16; F16H 2057/0213
  See application file for complete search history.

(56) References Cited

U.S. PATENT DOCUMENTS

2019/0296688 A1*  9/2019  Kresse .................... F24S 25/12

FOREIGN PATENT DOCUMENTS

| CN | 104033507 A | 9/2014 |
| CN | 104980098 A | 10/2015 |
| CN | 209435158 U | 9/2019 |
| CN | 111245342 A | 6/2020 |
| CN | 111262512 A | 6/2020 |
| CN | 211209639 U | * 8/2020 | ............. F24S 30/48 |

(Continued)

OTHER PUBLICATIONS

International Search Report of PCT Patent Application No. PCT/CN2021/125982 issued on Jan. 30, 2022.

*Primary Examiner* — Zakaria Elahmadi

(57) ABSTRACT

A solar tracker includes a main beam and at least one slewing reducer, one of the slewing reducer is connected to a motor, the motor is controlled by a motor controller, and the motor controller is connected to the motor by a cable; the slewing reducer that is connected to the motor is a driving slewing reducer, and the other slewing reducers are driven slewing reducers, the torque of the driving slewing reducer is transmitted to the driven slewing reducers through a transmission shaft, and the driving slewing reducer and the driven slewing reducers rotate synchronously to drive the main beam to rotate; the main beam is provided through the interior of the slewing reducer.

13 Claims, 41 Drawing Sheets

(56) References Cited

FOREIGN PATENT DOCUMENTS

| | | | |
|---|---|---|---|
| CN | 211296653 U | | 8/2020 |
| CN | 111731038 A | | 10/2020 |
| CN | 111765236 A | * | 10/2020 |
| CN | 111853161 A | | 10/2020 |
| CN | 112671316 A | | 4/2021 |
| CN | 112815045 A | | 5/2021 |
| CN | 112987801 A | | 6/2021 |
| CN | 217590716 U | * | 10/2022 ............. H02S 20/32 |

* cited by examiner

SOLAR TRACKER

CROSS REFERENCE TO RELATED APPLICATIONS

The present application is a Continuation Application of PCT Application No. PCT/CN2021/125982 filed on Oct. 25, 2021, which claims the benefit of Chinese Patent Application Nos. 202011423316.3 filed on Dec. 8, 2020, 202110124983.X filed on Jan. 29, 2021, 202110306266.9 filed on Mar. 23, 2021 and 202110566999.6 filed on May 24, 2021. All the above are hereby incorporated by reference in their entirety.

TECHNICAL FIELD

The present invention generally relates to the technical field of solar power generation, and particularly to a solar tracker.

BACKGROUND

The solar photovoltaic power generation has a rapidly rising proportion in the power generation market, and its market prospect is extremely considerable. In the large-scale commercial power stations, the tracking power generation system can increase the power generation capacity of a power station by more than 20% compared with stationary power generation systems. Therefore, more and more commercial power stations will adopt tracking power generation in the future, and more requirements will be proposed for a single main beam multi-point driving solar tracking power generation system (tracking support). At present, the mainstream flat single-axis or oblique single-axis tracking power generation system in the current market has increased the installed power due to the increased power of assembly, and their structural shortcomings have become increasingly obvious, which cannot adapt to the higher and more use requirements of the tracker in the future. Since the conventional flat single axis has only one rigid support driving point, the longer the length of the single support, the easier it is to produce low-frequency resonance; in addition, the torque tube at both ends of the driving point is prone to torsion deformation at the end of the main beam, which has suppressed the increase in the installed capacity and reduced the cost per watt of conventional flat single-axis tracking power generation system.

SUMMARY

In order to overcome the shortcomings of the prior art, the present invention provides a solar tracker.

In order to solve the problems that the flat single-axis in the solar tracking system is prone to low-frequency resonance and the main beam of the torque tube at both ends of the main beam is prone to torsion and deformation, a single main beam multi-point driving solar tracking power generation system is provided.

A single main beam multi-point driving solar tracking system, comprising a main beam and at least one slewing reducer, one of the slewing reducer is connected to a motor, the motor is controlled by a motor controller, and the motor controller is connected to the motor by a cable; the slewing reducer that is connected to the motor is a driving slewing reducer, and the other slewing reducers are driven slewing reducers, the torque of the driving slewing reducer is transmitted to the driven slewing reducers through a transmission shaft, and the driving slewing reducer and the driven slewing reducers rotate synchronously to drive the main beam to rotate.

In the tracking power generation system, the solar panel is fixed on the main beam, and the main beam rotates to drive the angle adjustment of the solar panel to realize the tracking of the solar energy by the solar panel. Generally, the span of two columns is basically 7 to 8 meters or more. Therefore, when the torque transmission shaft has a large span between the driving slewing reducer and the driven slewing reducer, it is prone to sag under its dead weight, leading to lag in torque transmission and creeping phenomenon.

In the solar tracking system, the stability of the transmission shaft is the basis for the stability of the entire tracking system. The object of the first aspect of the present invention is to provide a solar tracking system with stable torque transmission.

Optionally, the slewing reducer and the transmission shaft are rotatably provided with the main beam synchronously in the same direction.

Optionally, the slewing reducer is a worm gear slewing reducer, the worm gear of the slewing reducer is fixedly arranged on the column, and the shell of the slewing reducer is fixedly connected to the main beam, the worm gear is fixedly engages with the shell; when the motor is started, the worm rotates around the worm gear while revolving to drive the slewing reducer and the main beam to rotate.

Optionally, the transmission shaft is provided with a plurality of connecting members spaced apart in the length direction, and the connecting member is connected to the main beam.

Optionally, one end of the connecting member is sleeved on the transmission shaft, and the other end is sleeved on the main beam, the transmission shaft is provided with a bearing at the connection point, and the main beam is provided with a frame and a fastener at the connection point.

Optionally, a connecting plate is provided on the column, and a connecting portion connected to the connecting plate is provided on the worm gear.

Optionally, the shell of the slewing reducer is provided with a first connecting column and a second connecting column, and the main beam on the left side of the slewing reducer is connected to the first connecting column, the main beam on the right side of the slewing reducer is connected to the second connecting column; the second connecting column and the shell are an integral structure, and the first connecting column is detachably connected to the second connecting column.

Optionally, a rolling bearing assembly and a sliding bearing assembly are provided between the worm gear and the first connecting column, and the rolling bearing assembly comprises an inner ring, an outer ring, and a plurality of balls arranged between the inner ring and the outer ring, the inner ring is formed on the first connecting column, and the outer ring is formed on the worm gear.

Optionally, the sliding bearing assembly comprises a first sliding portion and a second sliding portion, and the first sliding portion is formed on the second connecting column, the second sliding portion is formed on the worm gear.

Optionally, the worm gear is provided with an incomplete convex ring in the circumferential direction, and the shell is provided with a lobe engaging with the incomplete convex ring.

Optionally, one end of the worm is externally sleeved with a first bevel gear and a transmission gear, and the motor output end is provided with a first gear meshing with the transmission gear, the transmission shaft is externally sleeved with a second bevel gear, and the first bevel gear meshes with the second bevel gear.

Solar power stations are usually installed in areas where the environment is relatively harsh (such as plains and deserts). The winds and sands, corrosive gases, rainwater, etc. can shorten the service life of the transmission shaft and affect its use effect. The object of the second aspect of the present invention is to provide a multi-point drive tracking transmission system that improves the service life of the transmission shaft.

Optionally, the transmission shaft is positioned inside the main beam.

Optionally, the slewing reducer is provided with a plurality of bevel gear sets, and the transmission shaft drivingly engages with an input end or an output end of the slewing reducer through the plurality of bevel gear sets.

Optionally, a bevel gear set and a universal corner joint are provided inside the slewing reducer, and the transmission shaft drivingly engages with an input end or an output end of the slewing reducer through the bevel gear set or the universal joint.

Optionally, a first bevel gear set, a second bevel gear set and a third bevel gear set are provided inside the slewing reducer, the transmission shaft is externally sleeved with a fourth bevel gear, and one end of the first bevel gear set meshes with the input end or output end of the slewing reducer, one end of the third bevel gear set meshes with the fourth bevel gear, and the two ends of the second bevel gear set mesh with the other ends of the first bevel gear set and the third bevel gear set, respectively.

Optionally, a first bevel gear set and a second bevel gear set are provided inside the slewing reducer, the transmission shaft is externally sleeved with a fourth bevel gear, the first bevel gear set meshes with the fourth bevel gear, and one end of the second bevel gear set meshes with the input end or output end of the slewing reducer, and the other end of the second bevel gear set meshes with the first bevel gear set, and the universal joint is provided on the second bevel gear set.

Optionally, the slewing reducer is a worm gear slewing reducer. The worm gear of the slewing reducer is integrally formed with a first connecting column and a second connecting column. The main beam on the left side of the slewing reducer is connected to the first connecting column, and the main beam on the right side of the slewing reducer is connected to the second connecting column.

Optionally, both the first connecting column and the second connecting column are arranged in a rectangular shape.

Optionally, the shell of the slewing reducer is provided with a first limiting portion, and the worm gear is circumferentially provided with a second limiting portion that engages with the first limiting portion.

In the solar tracking system, the motor is connected to the motor controller through a cable, and the stability of the cable is the basis for the stability and reliability of the entire tracking system. The object of the third aspect of present invention is to provide a solar tracking system with a stable connection between the motor and the motor controller.

Optionally, the lower part of the shell of the slewing reducer is provided with a mounting position for the motor, and the motor and the motor controller are in a relatively static state.

Optionally, the motor controller is provided on the main beam.

Optionally, the motor controller is provided on the column.

Optionally, the slewing reducer is a worm gear slewing reducer, and the motor is arranged in parallel with the worm.

Optionally, the output end of the motor is provided with a first gear, the worm is provided with a transmission gear, and the shell is provided with a transfer gear, and the transfer gear meshes with the first gear and the transmission gear respectively.

Optionally, a support lug is provided outside the motor shell, and a support portion connected to the support lug is provided on the shell.

In the tracking power generation system, the motor is the key to driving the slewing reducer, and the slewing reducer drives the main beam to rotate. The motor has an important relationship with the mounting method of the slewing reducer. The object of the fourth aspect of the present invention is to provide a photovoltaic tracking system with multiple installation orientations of motors.

Optionally, the lower part of the shell of the slewing reducer is provided with a mounting position for the motor.

Optionally, the motor is disposed at the lower part of the shell of the slewing reducer, the motor and the shell of the slewing reducer are on the same vertical plane, and the motor is arranged in parallel with the worm of the slewing reducer.

Optionally, the motor is disposed at the lower part of the shell of the slewing reducer, the motor and the shell of the slewing reducer are on the same vertical plane, and the motor is arranged perpendicularly to the worm of the slewing reducer.

Optionally, the motor is disposed on the left side of the lower part of the shell of the slewing reducer, and the motor is arranged perpendicularly to the worm of the slewing reducer.

Optionally, the motor is disposed on the right side of the lower part of the shell of the slewing reducer, and the motor is arranged perpendicularly to the worm of the slewing reducer.

Optionally, the motor output end is connected to a worm through a gear drive.

In the solar tracking system, the slewing reducer is the core device that drives the rotation of the main beam. The object of the fifth aspect of the present invention is to provide a slewing reducer with high radial load and good stability.

Optionally, the shell of the slewing reducer is provided with a first limiting portion, and the worm gear is circumferentially provided on a second limiting portion that engages with the first limiting portion.

Optionally, the first limiting portion is a lobe fixedly connected in the shell, and the second limiting portion is a convex ring fixedly to the worm gear in the circumferential direction.

Optionally, the lower part of the shell of the slewing reducer is provided with an installation position for the power supply.

Optionally, the slewing reducer is a worm gear slewing reducer, the worm gear of the slewing reducer is fixedly arranged on the column, and the shell of the slewing reducer is fixedly connected to the main beam, the worm gear rotatably engages with the shell; when the motor is started, the worm rotates around the worm gear while revolving to drive the slewing reducer and the main beam to rotate.

Optionally, the shell is provided with a first connecting column and a second connecting column, the main beam on the left side of the slewing reducer is connected to the first connecting column, and the main beam on the right side of the slewing reducer is connected to the second connecting column; the second connecting column and the shell are an integral structure, and the first connecting column is detachably connected to the second connecting column.

Optionally, a rolling bearing assembly and a sliding bearing assembly are provided between the worm gear and the first connecting column, and the rolling bearing assembly comprises an inner ring, an outer ring, and a plurality of balls arranged between the inner ring and the outer ring, the inner ring is formed on the first connecting column, and the outer ring is formed on the worm gear.

Optionally, the sliding bearing assembly comprises a first sliding portion and a second sliding portion, and the first sliding portion is formed on the second connecting column, the second sliding portion is formed on the worm gear.

Optionally, a bevel gear set and a universal joint are provided inside the slewing reducer, and the transmission shaft drivingly engages an input end or an output end of the slewing reducer through the bevel gear set or the universal joint.

Optionally, a first bevel gear set, a second bevel gear set and a third bevel gear set are provided inside the slewing reducer, the transmission shaft is externally sleeved with a fourth bevel gear, and one end of the first bevel gear set meshes with the input end or output end of the slewing reducer, one end of the third bevel gear set meshes with the fourth bevel gear, and the two ends of the second bevel gear set mesh with the other ends of the first bevel gear set and the third bevel gear set, respectively.

Optionally, a first bevel gear set and a second bevel gear set are provided inside the slewing reducer, the transmission shaft is externally sleeved with a fourth bevel gear, the first bevel gear set meshes with the fourth bevel gear, and one end of the second bevel gear set meshes with the input end or output end of the slewing reducer, and the other end of the second bevel gear set meshes with the first bevel gear set, and the universal joint is provided on the second bevel gear set.

Optionally, the slewing reducer is a worm gear slewing reducer. The worm gear of the slewing reducer is integrally formed with a first connecting column and a second connecting column. The main beam on the left side of the slewing reducer is connected to the first connecting column, and the main beam on the right side of the slewing reducer is connected to the second connecting column.

In the tracking power generation system, the stability of the transmission shaft is the basis for the stability of the entire tracking system. During the long-term movement of the transmission shaft, the multi-point driving tracking support has a large span between the two column supports, which will cause the transmission shaft to sag and cause deformation. The object of the sixth aspect of the present invention is to provide a solar tracking system with stable torque transmission.

Optionally, the connecting member is connected to the main beam through a sliding rail, and the connecting member can slide on the sliding rail.

Optionally, the connecting member slides outside the sliding rail.

Optionally, a slip ring is provided on the connecting member, and the slip ring is sleeved outside the sliding rail.

Optionally, the connecting member slides inside the sliding rail.

Optionally, an annular chute is provided outside the connecting member, an annular groove that engages with the annular chute is provided inside the sliding rail, and the annular chute can slide in the annular groove.

Optionally, the sliding rail is arranged in a circular arc shape, the sliding rail is provided with a frame consistent with the shape of the main beam, and the main beam is provided through the interior of the frame.

Optionally, both ends of the worm gear are connected to the main beam by a connecting assembly, and the connecting assembly comprises a disc, a square shaft, and a connecting column arranged between the disc and the square shaft.

Optionally, the square shaft is arranged eccentrically relative to the disc, the disc is provided with a first positioning hole, and the worm gear is provided with a second positioning hole, and the first positioning hole is in anti-rotation engagement with the second positioning hole through a locking member.

In the solar tracking system, the main beam may not be mounted or the length is insufficient due to the column size error for foundation construction. The object of the seventh aspect of the present invention is to provide a multi-point drive tracking transmission system with a controllable length of the main beam.

Optionally, the main beam is provided through the interior of the slewing reducer.

Optionally, the main beam is sleeved with a rotating shaft, and the rotating shaft engages with the worm gear through a rolling bearing.

Optionally, the main beam is connected to the rotating shaft and a shell through a retaining member.

Optionally, the retaining member is provided with a convex ring extending outwardly in the axial direction, a first inclined plane structure is arranged on the outer wall of the convex ring from top to bottom, a second inclined plane structure is arranged on the inner wall of the rotating shaft and the shell of the slewing reducer from bottom to top, and the first inclined plane can move left and right along the second inclined plane.

Optionally, the retaining member is provided with a truncated cone extending outwardly in the radial direction, the truncated cone is provided with a first locking hole, both the rotating shaft and the shell of the slewing reducer are provided with a second locking hole, and the first locking hole is in anti-rotation engagement with the second locking hole through a locking member.

Optionally, a first inclined plane structure is arranged on the outer wall of the retaining member from top to bottom, and the inner wall of the rotating shaft is provided with a plurality of stiffeners extending inwardly in the circumferential direction, a second inclined plane structure is arranged on the inner walls of the stiffeners from bottom to top, and the first inclined plane can move left and right along the second inclined plane.

Optionally, the retaining member is provided with a boss extending outwardly in the radial direction, the boss is provided with a first locking hole, both the rotating shaft and the shell of the slewing reducer are provided with a second locking hole, and the first locking hole is in anti-rotation engagement with the second locking hole through a locking member.

Optionally, the shape of the inner wall of the retaining member is the same as the shape of the outer wall of the main beam.

The seven aspects of technical solutions of the present invention can be used as independent solutions or can be combined with each other. The structure in the solution of any aspect of the present invention can be used as an independent technical solution or can be combined with other technical solutions.

In summary, the present invention has the following technical solutions.

1. The transmission shaft and the main beam of the present invention move simultaneously in the same direction, and the transmission shaft can be supported by the main beam, so that the transmission shaft is not easy to be twisted or broken, and has a long service life; in addition, with this structure, the diameter of the transmission shaft needs not to be too large, so the equipment investment cost is low; and because the transmission shaft, the motor, and the main beam all rotate synchronously, the photovoltaic panel will not collide with the transmission shaft during the flipping process of the main beam, so the main beam has a larger adjustable angle, a higher flexibility, and the equipment has a prolonged service life.

2. With the integrated arrangement of the second connecting column and the shell, the processing is more convenient, sufficient strength and rigidity can be guaranteed, and safety can be ensured; in addition, the first connecting column and the second connecting column are arranged separately, so that it is more convenient to assemble the first connecting column and the second connecting column, and replace them separately when damaged, with low cost for maintenance. The split structure can make the connecting column structure to be stronger during processing, to prolong the service life; and with the detachable connection method, the assembly and maintenance are very convenient.

3. The transmission shaft is provided inside the main beam, which prevents the transmission shaft from being affected by the harsh environment, avoids problems of the transmission shaft such as corrosion and aging, etc., and extends the service life of the transmission shaft; in addition, the jamming of the transmission shaft caused by wind and sand is reduced, lowering the fault rate; and, because the transmission shaft is provided inside, the appearance and layout of the entire equipment is more concise and beautiful.

4. The arrangement of universal joints ensures that the transmission chain realizes the corner function and makes the power transmission more stable.

5. The motor and the motor controller are arranged in a relatively static state, so that the cable between the motor and the motor controller will not be pulled during the flipping process of the main beam, and there will be no cable rupture or loose interface. The equipment fault rate is low and the safety is high; moreover, the cables will not be threaded, knotted and wound, ensuring the beautiful appearance of the entire equipment.

6. The structures of the first limiting portion and second limiting portion are provided, which ensures that the slewing reducer has a higher stability during rotation; moreover, it ensures higher safety protection ability in case of failure of external travel switch.

7. The multi-point driving tracking of the large span between two columns of the connecting member solves the problems of the deformation of the transmission shaft caused by sagging, the rotation vibration caused by the bending of transmission shaft, and the discontinuous rotation of the transmission shaft caused by the sagging and deformation;

8. With the arrangement of the sliding rail and connecting member, the main beam drives the slip ring of the transmission shaft to rotate; the rotations of the main beam and the transmission shaft do not interfere with each other, and both of them can rotate freely within a limited range;

9. With the eccentric setting, one end that connects to the worm gear is designed to be small and the other end is designed to be large, to match the main beam with a large size;

10. The main beam passes through the middle of the reducer, so the length of the main beam can be longer, which can effectively reduce the joints between the main beams, increase the rigidity and strength of the entire support and reduce the risk;

11. The inner ring of the retaining member is provided with the same shape as the main beam, to ensure the rigidity of the connection between the torque tube and the reducer;

12. The first inclined plane and the second inclined plane are provided. When the locking member moves, the retaining member will shrink and change, and produce a radial pressure on the main beam, to achieve the purpose of locking the torque tube of the main beam.

DETAILED DESCRIPTION

Figure 1:
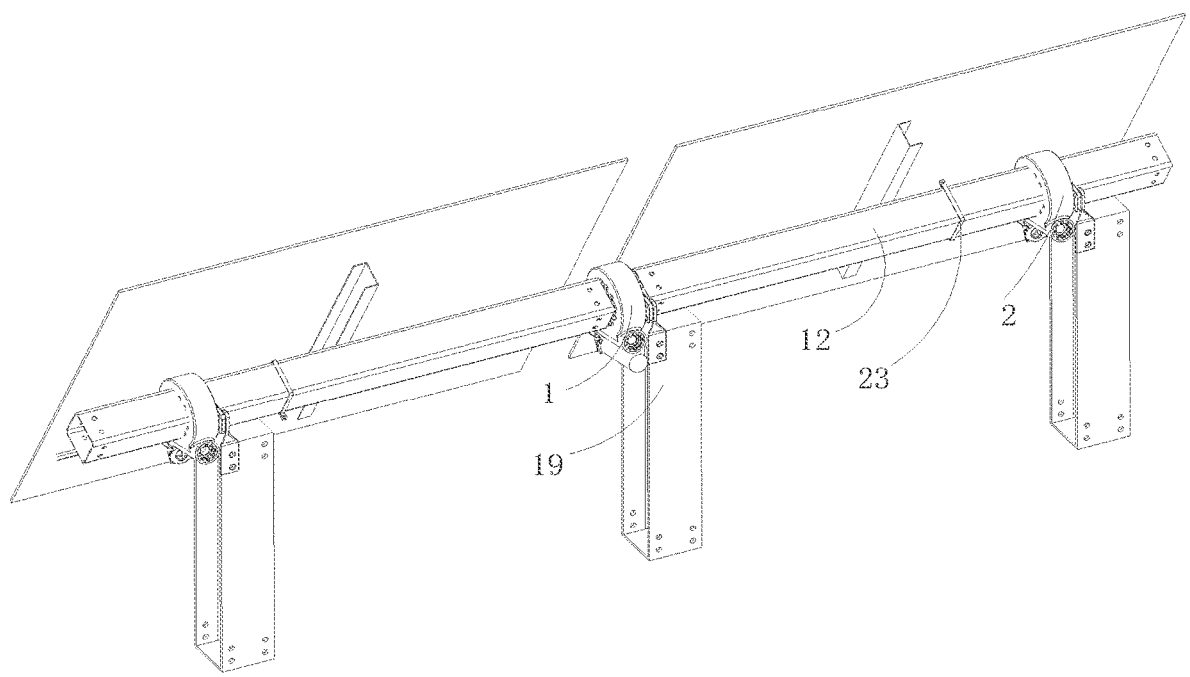
FIG. 1 is a schematic view of the present invention.
Figure 59:
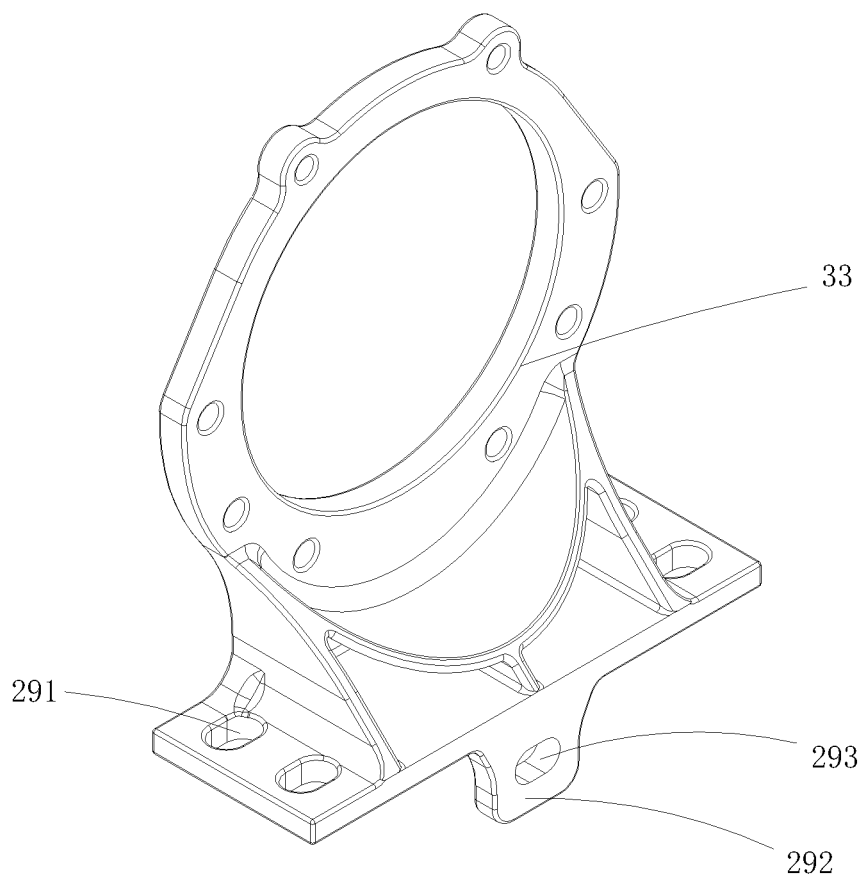
FIG. 59 is a perspective view of a mounting base in FIG. 51.

As shown in FIGS. 1 to 59, a single main beam multi-point driving solar tracking system comprises a main beam 12 and at least one slewing reducer 1, and the number of the slewing reducers 1 can be adjusted according to the specific situation, which can be one or more than one, a plurality of slewing reducers 1 have exactly the same internal structure; one of the slewing reducer is connected to a motor 3, the motor 3 is controlled by a motor controller, and the motor 3 controller is connected to the motor by a cable; wherein the slewing reducer 1 that is connected to the motor 3 is a driving slewing reducer, and the other slewing reducers 1 are driven slewing reducers, the torque of the driving slewing reducer is transmitted to the driven slewing reducers through a transmission shaft 10, and the driving slewing reducer and the driven slewing reducers rotate synchronously to drive the main beam 12 to rotate.

As shown in FIG. 1, in some embodiments, the slewing reducer 1 and the transmission shaft 10 are rotatably provided with the main beam 12 synchronously in the same direction. The transmission shaft also follows the main beam to rotate synchronously in the same direction during the rotation of the main beam and the slewing reducer, which ensures that the main beam will not touch the transmission shaft during the rotation, and no jamming phenomenon that causes inability to rotate will occur; in addition, when the main beam and the transmission shaft rotate together, they will drive the connected lines to rotate together, therefore, the line needs not to be very long, and the line can be simplified. During the rotation, the line will not be knotted and wound. Ultimately, the transmission shaft and the main beam rotate synchronically in the same direction, which ensures that the bearing capacity of the transmission shaft is increased and the service life of the transmission shaft is extended.

As shown in FIGS. 2 to 5 and FIG. 14, in some embodiments, the slewing reducer 1 is a worm gear slewing reducer, the worm gear 14 of the slewing reducer is fixedly arranged on the column 19, and the shell of the slewing reducer 1 is fixedly connected to the main beam 12, the worm gear 14 rotatably engages with the shell of the slewing reducer 1; when the motor 3 is started, the worm 15 rotates around the worm gear 14 while revolving to drive the slewing reducer and the main beam 12 to rotate. The column 19 and the main beam 12 mentioned above are the prior art. The bottom of the column 19 is in contact with the ground, and the main beam 12 can drive the photovoltaic panel to rotate together; it is not described here again. A sealing ring 16 is provided at the joint between the worm gear 14 and the slewing reducer 1. The sealing ring 16 can be made of materials with good weather resistance, such as rubber, steel plate, etc. The materials with good weather resistance can block the direct sunlight to the sealing ring 16, delay the aging of the seals and increase the service life. The sealing ring 16 is U-shaped, and the sealing ring 16 is provided with a circle of convex rib 17. The sealing ring 16 can prevent external dust from entering and has a certain dustproof effect. In addition, when the sealing ring 16 is inserted between the shell of the slewing reducer 1 and the worm gear 14, the sealing ring 16 and the worm gear 14 are fixed through the convex rib 17, which ensures the stability of the worm gear 14 when rotating. Optionally, a cover plate 18 is provided on the shell of the slewing reducer 1. The cover plate 18 can be fixed to the shell of the slewing reducer 1 in a shape of bolts and nuts. The cover plate 18 keeps the shell of the slewing reducer 1 in a closed state. The arrangement of the cover plate 18 can prevent external dust from entering the shell of slewing reducer 1 and affect the stability of its internal mechanical structure; the worm gear 14 of slewing reducer is fixedly arranged on the column 19, and the shell of the slewing reducer 1 is fixedly connected to the main beam 12, the worm gear 14 rotatably engages with the shell of the slewing reducer 1; when the motor 3 is started, the worm 15 rotates around the worm gear 14 while revolving to drive the slewing reducer and the main beam 12 to rotate. The column 19 and the main beam 12 mentioned above are the prior art. The bottom of the column 19 is in contact with the ground, and the main beam 12 can drive the photovoltaic panel to rotate together; it is not described here again.

Figure 7:
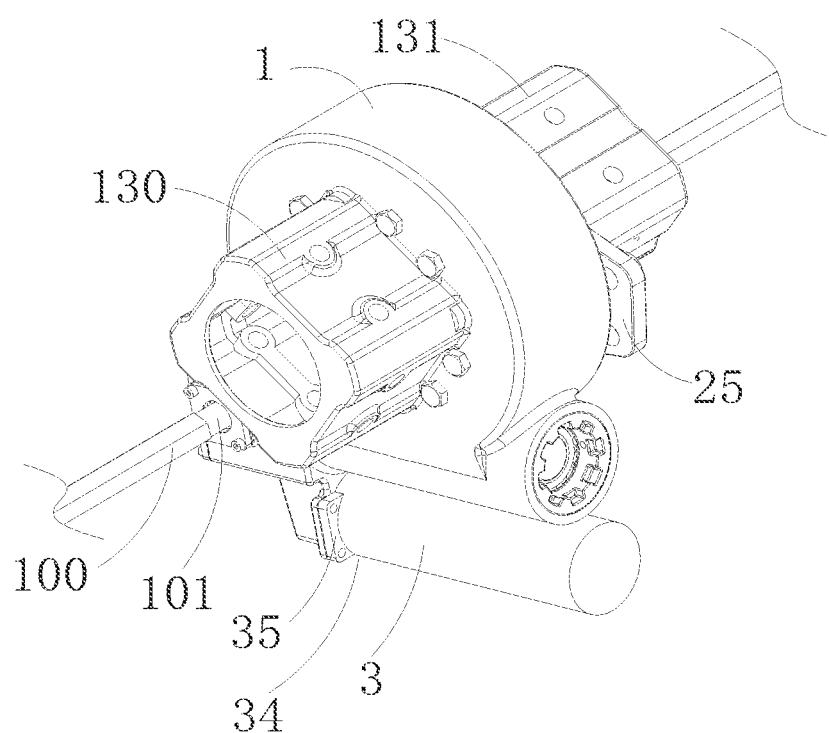
FIG. 7 is a partial schematic view I of the present invention.

As shown in FIG. 7, in some embodiments, the transmission shaft 10 is composed of a circular pillar 100 and two diamond-shaped pillars 101. The diamond-shaped pillars 101 are hexagon, and the two ends of the circular pillar 100 are inserted inside the two diamond-shaped pillars 101. The transmission shaft 10 is externally sleeved with a second bearing 11 that engages with the slewing reducer 1.

Figure 2:
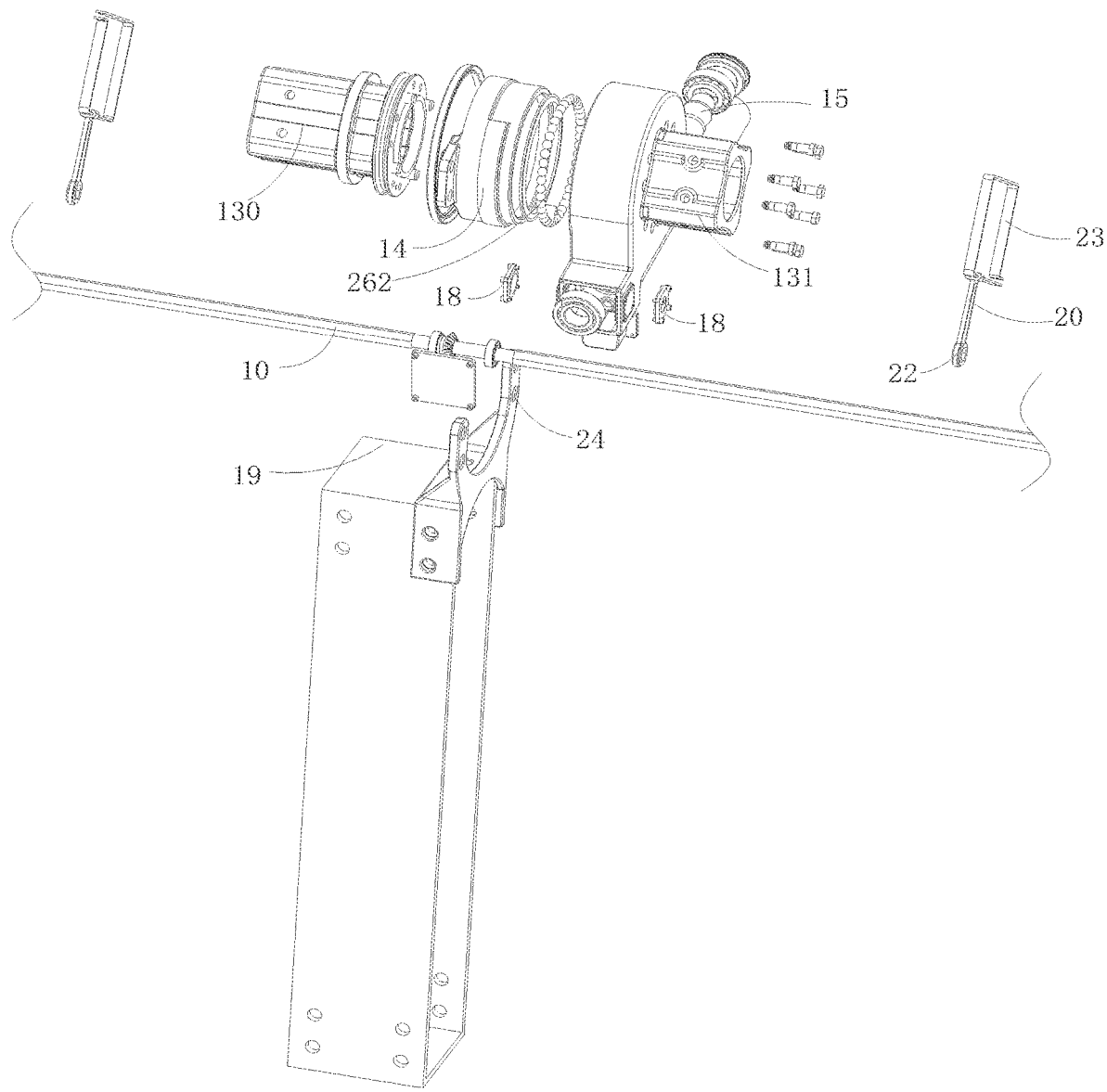
FIG. 2 is an exploded view of the present invention.
Figure 3:
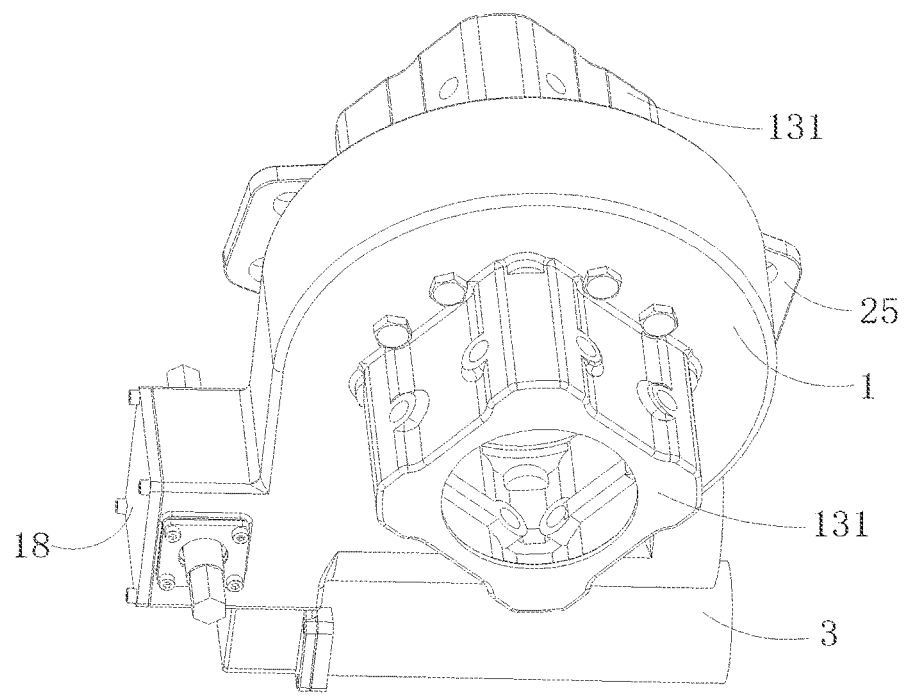
FIG. 3 is a schematic view of a slewing reducer of the present invention.
Figure 13:
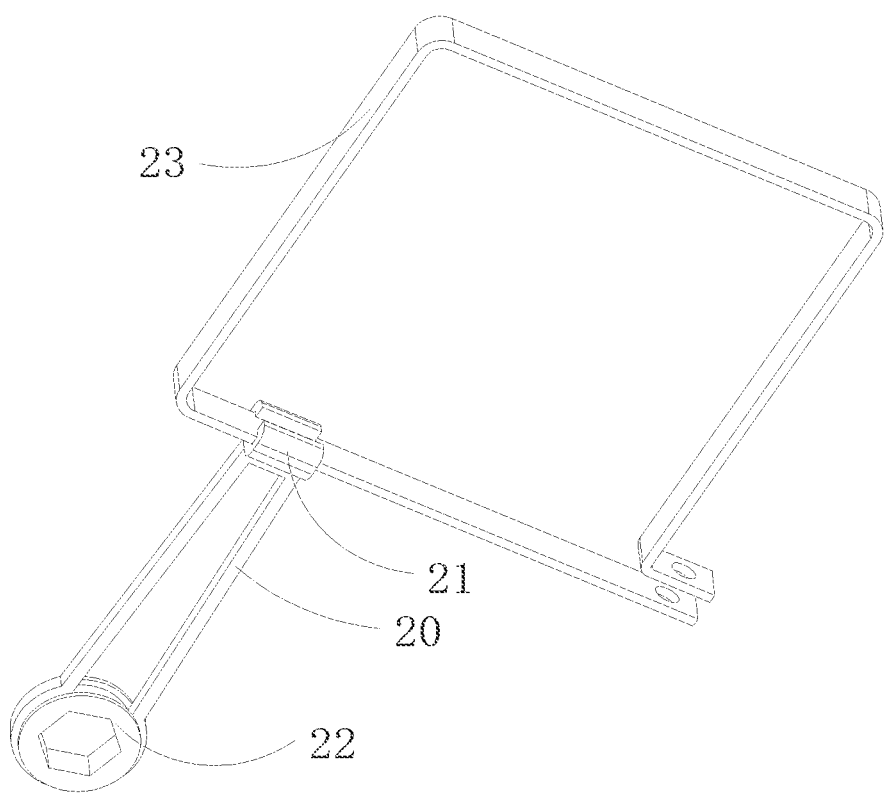
FIG. 13 is a partial schematic view II of the present invention.
Figure 14:
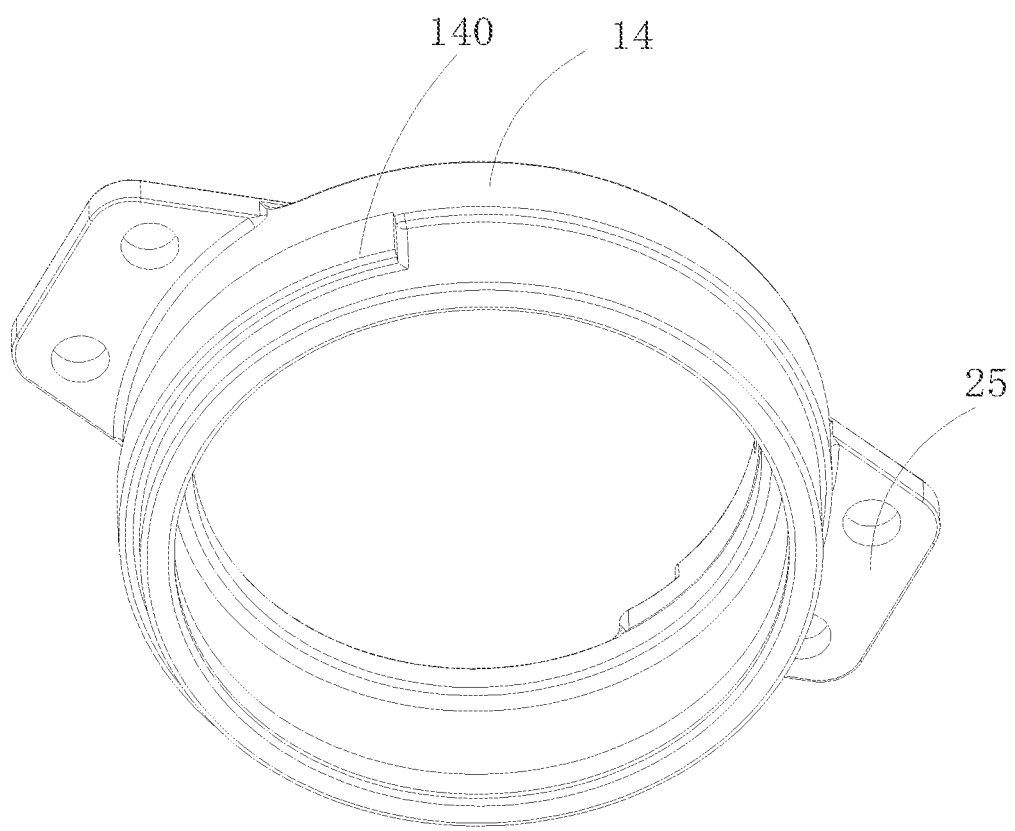
FIG. 14 is a schematic view of a worm gear of the present invention.

As shown in FIGS. 2 and 13, in some embodiments, the transmission shaft 10 is provided with a plurality of connecting members 20 spaced apart in the length direction, and the connecting member 20 is connected to the main beam 12. Specifically, a buckle 21 is provided on one end of the connecting member 20 that is connected to the main beam 12, and the buckle 21 is buckled on the main beam 12.

As shown in FIGS. 2 and 13, in some embodiments, one end of the connecting member 20 is sleeved on the transmission shaft 10, and the other end is sleeved on the main beam 12, the transmission shaft 10 is provided with a first bearing 22 at the connection point, and the main beam 12 is provided with a frame 23 at the connection point, and the buckle 21 is buckled outside of frame 23. Specifically, the frame 23 is sleeved outside the main beam 12, and a pair of corner portions extending outwardly is provided on the frame 23. The pair of corner portions can be fixed in the form of bolts and nuts, so that the frame 23 and the main beam 12 are connected more firmly; furthermore, with the arrangement of the buckle 21, the connecting member 20 and frame 23 achieve detachable. When the parts of the connecting member 20 are damaged, the connecting member 20 can be replaced directly, which is more convenient and quick. Finally, the arrangement of the connecting member 20 can reinforce the fixing effect between main beam 12 and transmission shaft 10, ensuring higher synchronous transmission efficiency in the same direction.

Figure 12:
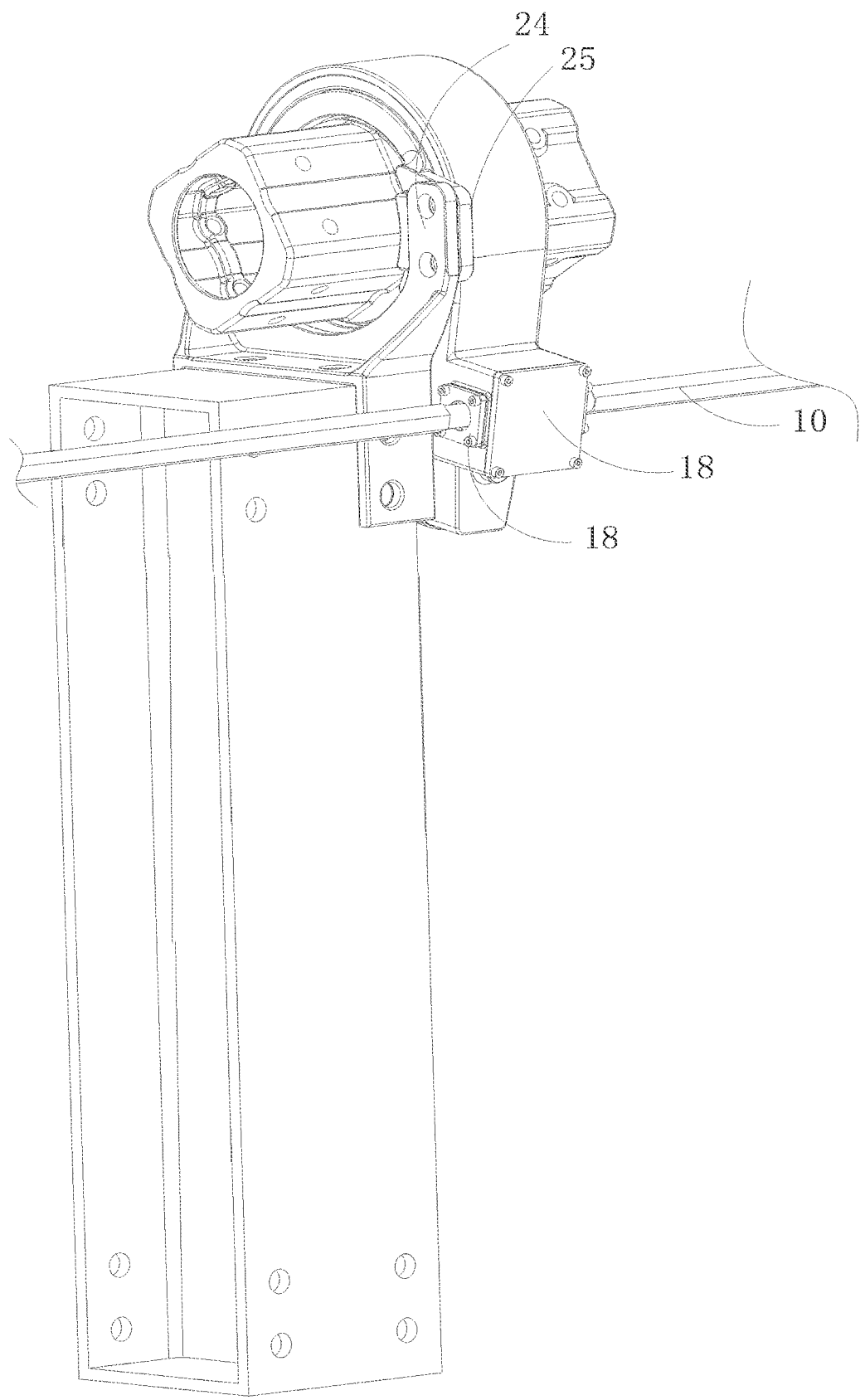
FIG. 12 is the second partial schematic view of the present invention.

As shown in FIG. 12, in some embodiments, a connecting plate 24 is provided on the column 19, and a connecting portion 25 connected to the connecting plate 24 is provided on the worm gear 14. The connecting plate 24 and the connecting portion 25 can be fixed in the form of bolts and nuts, and can be replaced separately when damaged, with a low maintenance cost.

Figure 5:
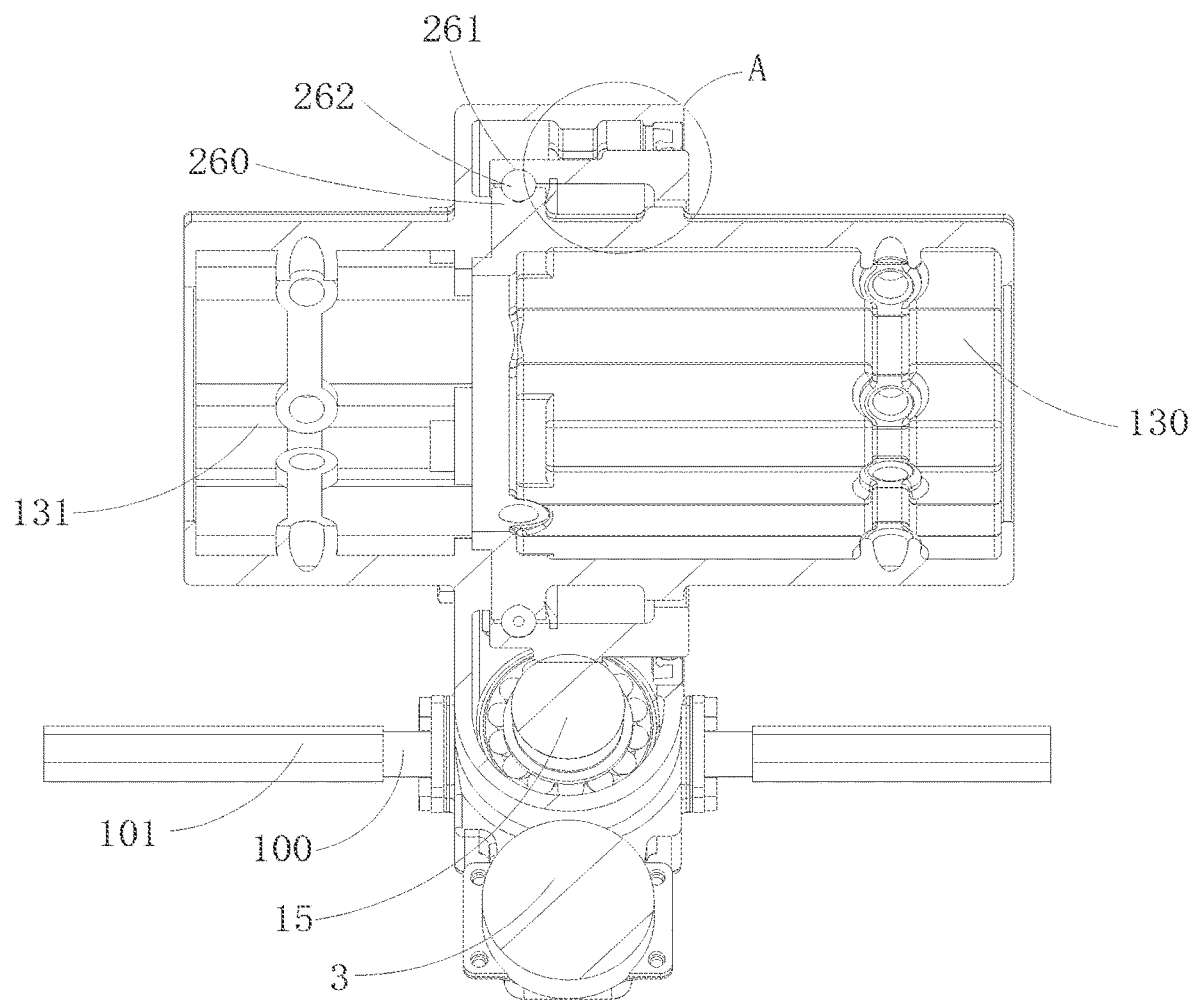
FIG. 5 is a partial cross-sectional view I of a slewing reducer of the present invention.
Figure 10:
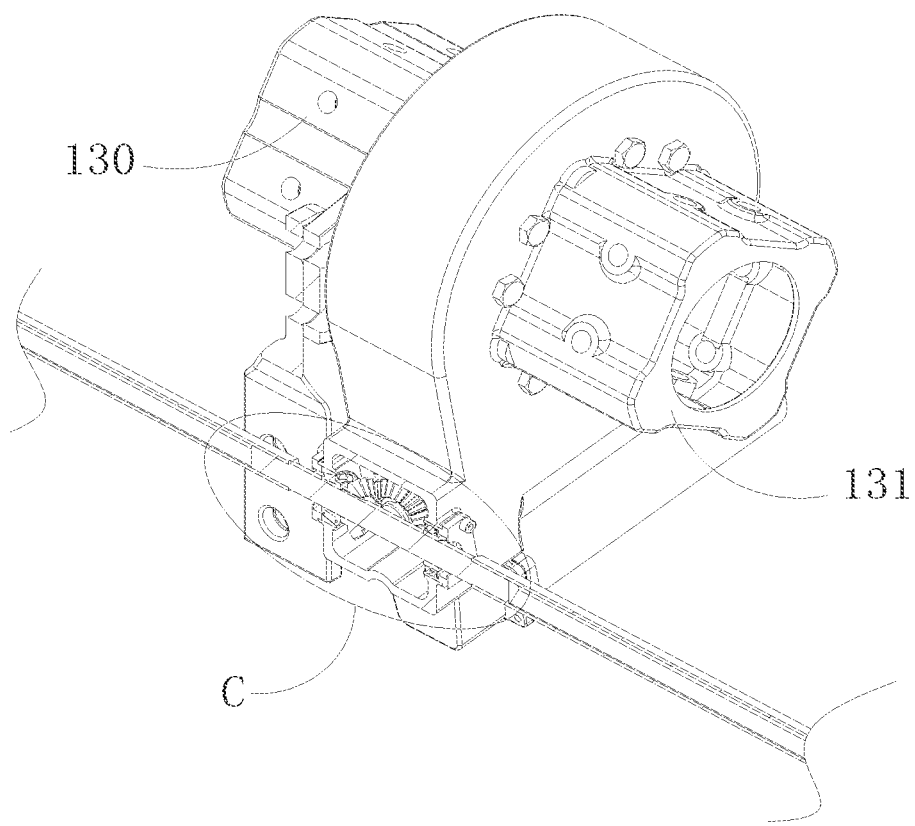
FIG. 10 is a partial cross-sectional three-dimensional view III of the present invention.
Figure 11:
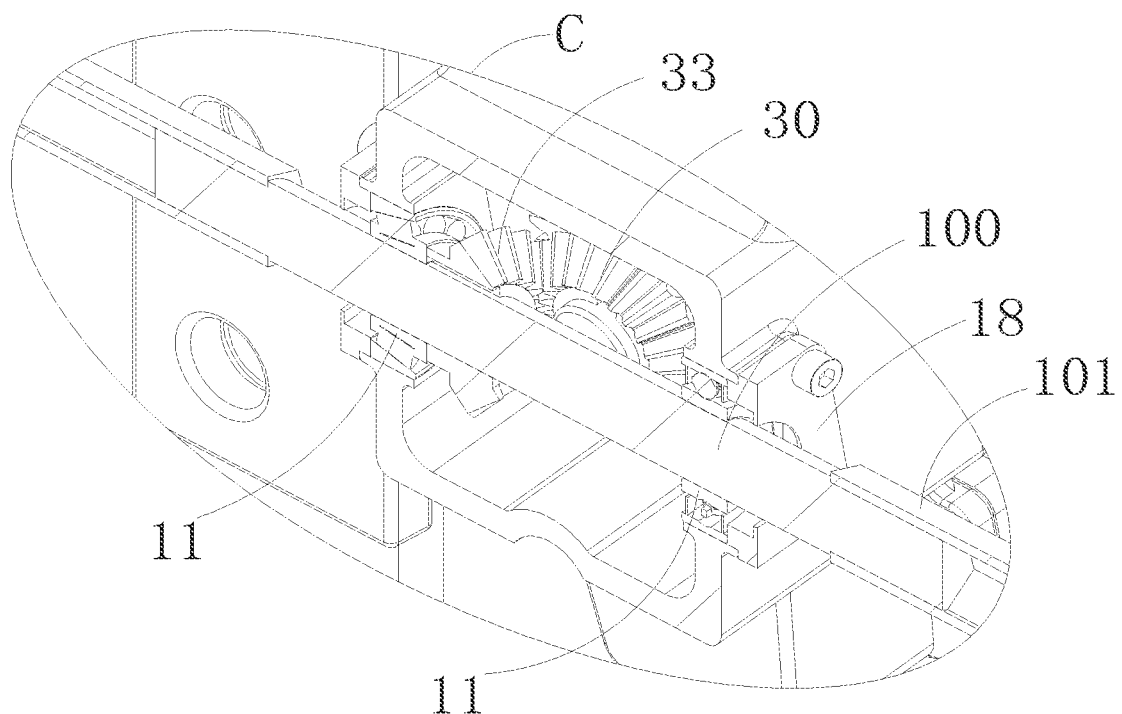
FIG. 11 is an enlarged view of a structure at C in FIG. 10.

As shown in FIGS. 5 and 10, in some embodiments, the shell of the slewing reducer 1 is provided with a first connecting column 130 and a second connecting column 131, and the main beam 12 on the left side of the slewing reducer is connected to the first connecting column 130, the main beam 12 on the right side of the slewing reducer is connected to the second connecting column 131; the second connecting column 131 and the shell of the slewing reducer 1 are an integral structure, and the first connecting column 130 is detachably connected to the second connecting column 131. With the integrated arrangement of the second connecting column 131 and the shell of the slewing reducer 1, the processing is more convenient, sufficient strength and rigidity can be guaranteed, and safety can be ensured; in addition, the first connecting column 130 and the second connecting column 131 are arranged separately, so that it is more convenient to assemble the first connecting column 130 and the second connecting column 131, and replace them separately when damaged, with low cost for maintenance. The split structure can make the connecting column structure to be stronger during processing, to prolong the service life; and with the detachable connection method, the assembly and maintenance are very convenient.

Figure 6:
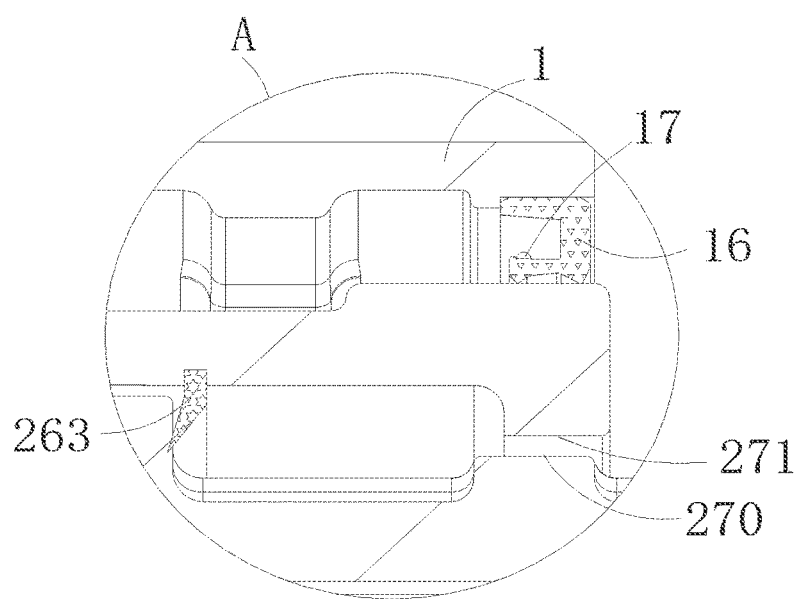
FIG. 6 is an enlarged view of a structure at A in FIG. 5.

As shown in FIGS. 5 and 6, in some embodiments, a rolling bearing assembly 26 and a sliding bearing assembly 27 are provided between the worm gear 14 and the first connecting column 130, and the rolling bearing assembly 26 comprises an inner ring 260, an outer ring 261, and a plurality of balls 262 arranged between the inner ring 260 and the outer ring 261, the inner ring 260 is formed on the first connecting column 130, and the outer ring 261 is formed on the worm gear 14. Specifically, the outer ring 261 is circumferentially provided with a sealing strip 263, and the sealing strip 263 can block dust from entering the inside of the ball 262, ensuring the stability of the ball 262 during rolling and making power transmission smoother.

Figure 17:
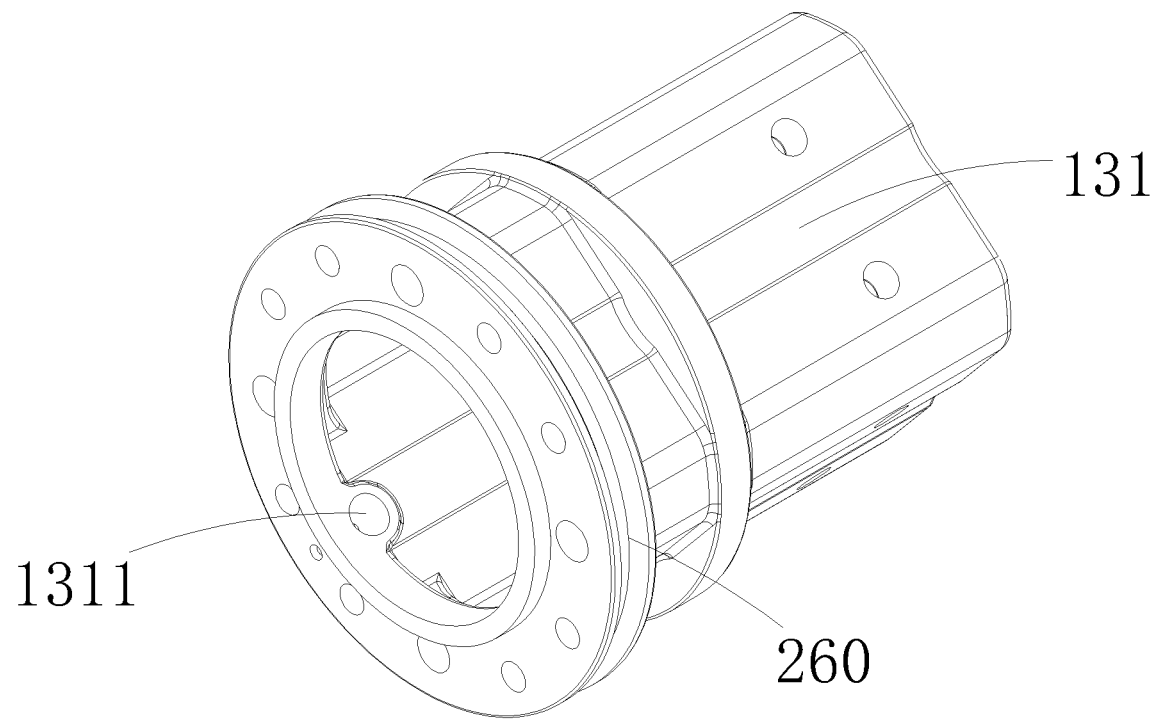
FIG. 17 is a perspective view of a second connecting column in FIG. 15.
Figure 18:
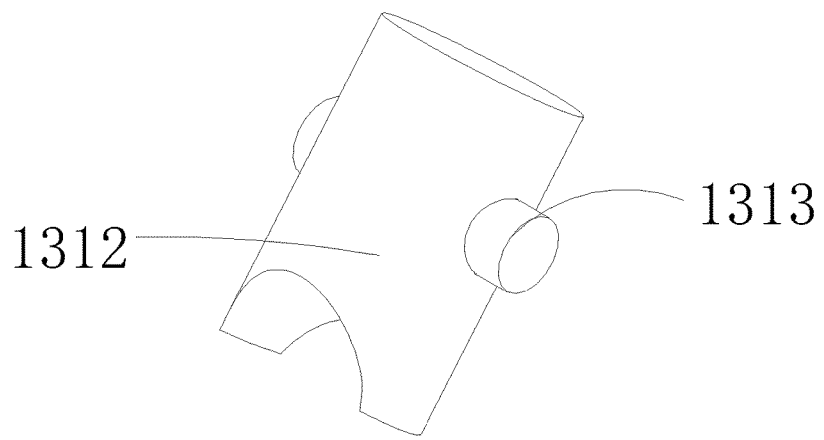
FIG. 18 is a perspective view of a plug in FIG. 15.

As shown in FIG. 5, FIG. 17, FIG. 18, in some embodiments, an annular chute 2611 is formed between the inner ring 260 and the outer ring 261 for a plurality of balls 262 to slide. A plug hole 1311 is provided on the second connecting column 131 in the radial direction. The plug hole 1311 is corresponding to the circular chute 2611 and is in communication with the inner holes of the circular chute 511 and the second connecting column 131; a plug 1312 is inserted into the plug hole 1311, to block the plug hole 1311 and fix the plug 1312 and the second connecting column with a taper pin 1313; when the second connecting column 131 is connected to the turbine 14, the ball 262 is inserted into the annular chute 2611 through the plug hole 1311, and plugged by the plug 1312. The structure is simple and is convenient to mount.

As shown in FIG. 7, in some embodiments, the first connecting column 130 and the second connecting column 131 are provided with the same shape, and both of which are composed of four straight sides and four arcs. Specifically, the four arcs in a rectangular shape are provided on the four corners of the four straight sides, so that the four corners bulge outwardly.

As shown in FIGS. 5 and 6, in some embodiments, the sliding bearing assembly 27 comprises a first sliding portion 270 and a second sliding portion 271, and the first sliding portion 270 is formed on the second connecting column 131, the second sliding portion 271 is formed on the worm gear 14.

Figure 8:
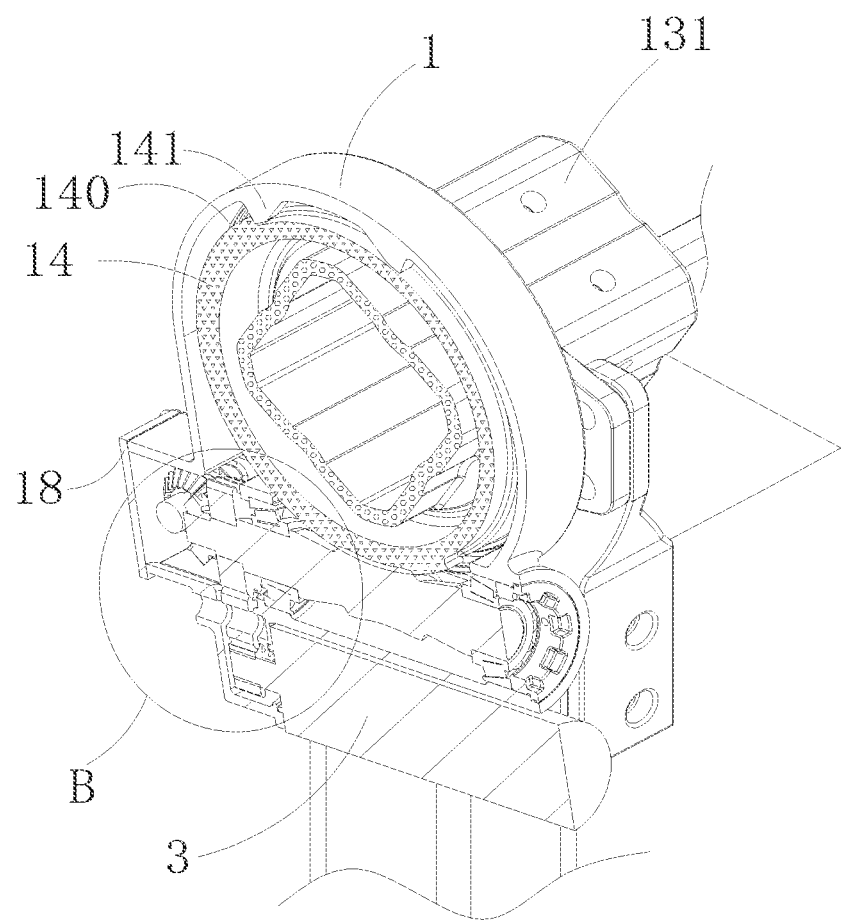
FIG. 8 is a partial cross-sectional three-dimensional view II of the present invention.
Figure 9:
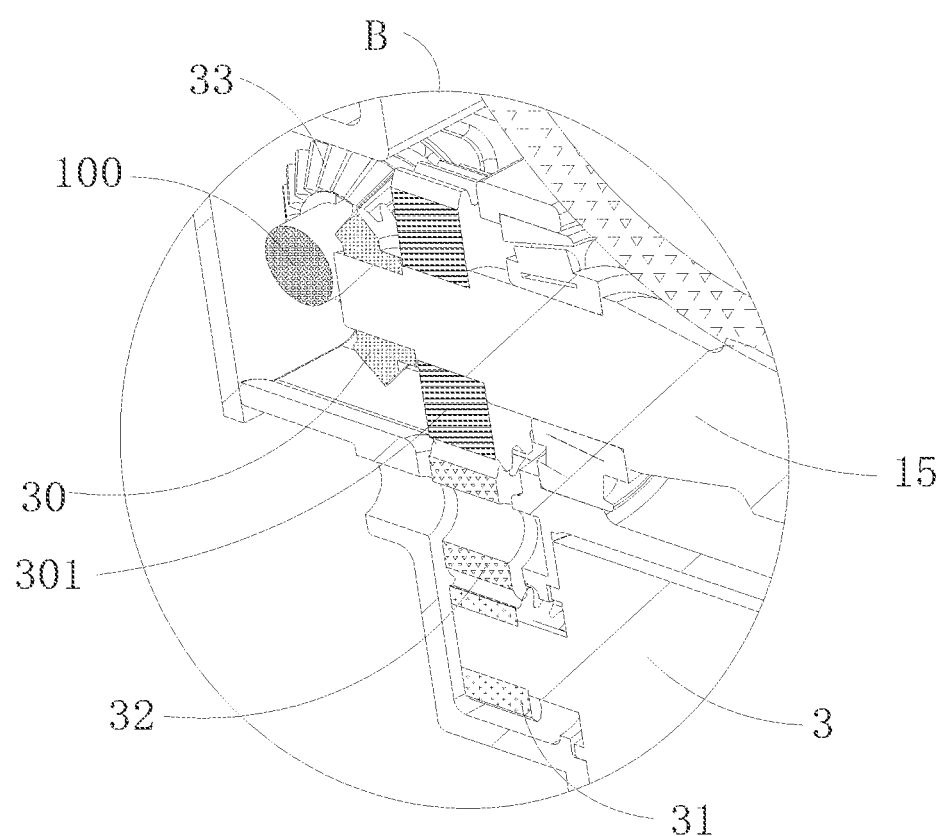
FIG. 9 is an enlarged view of a structure at B in FIG. 8.

As shown in FIGS. 8 and 9, in some embodiments, one end of the worm 15 is externally sleeved with a first bevel gear 30 and a transmission gear 301, and the motor 3 output end is provided with a first gear 31, the shell is provided with a transfer gear 32, and the first gear 31 meshes with its transmission gear 301 through the transfer gear 32. Specifically, the first gear 31 and the transfer gear 32 have the same shape and size, the area of the first gear 31 is smaller than the first bevel gear 30, the circular pillar 100 outside the transmission shaft 10 is externally sleeved with the second bevel gear 33, and the second bevel gear 33 meshes with a first bevel gear 30. When the motor 3 is started, the motor 3 drives the first gear 31 to rotate, and the first gear 31 meshes with the transfer gear 32, the transfer gear 32 rotates, and the transfer gear 32 rotates to mesh with the transmission gear 301, the transmission gear 301 rotates to drive worm 15 to rotate, and the worm 15 rotates to drive first bevel gear 30 to rotate. The first bevel gear 30 rotates to mesh with the second bevel gear 33, and the second bevel gear 33 drives the transmission shaft 10 to rotate.

Figure 15:
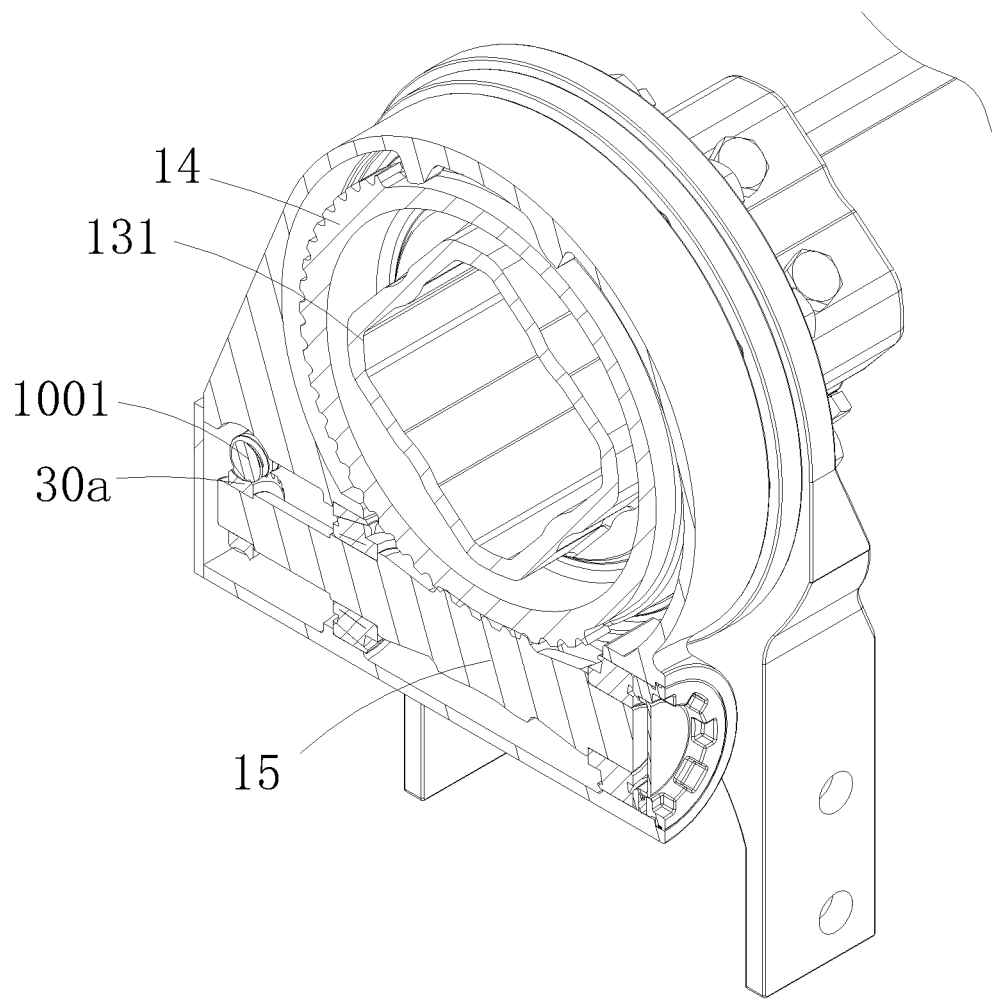
FIG. 15 is a three-dimensional sectional view of another embodiment of the slewing reducer in FIG. 1.
Figure 16:
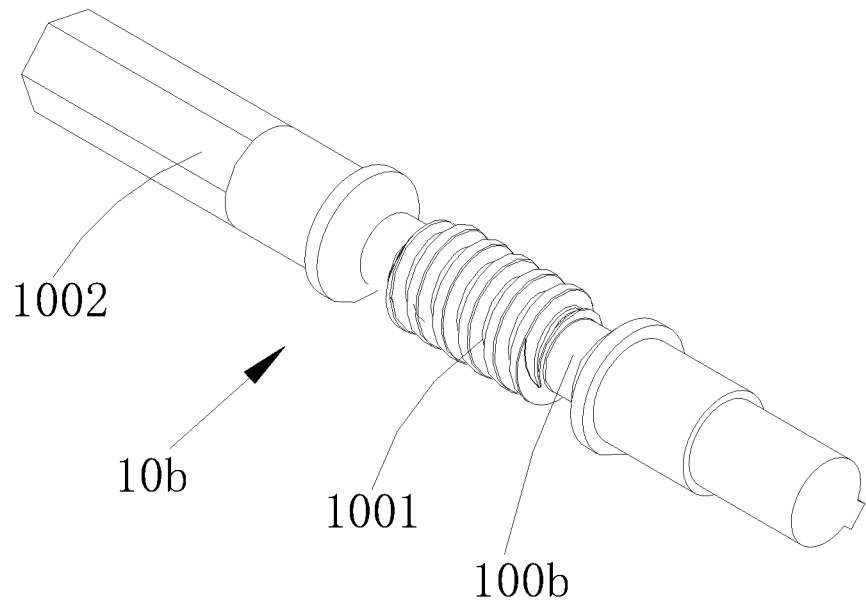
FIG. 16 is a perspective view of a transmission shaft in FIG. 15.

Of course, as shown in FIGS. 15 and 16, in other embodiments, one end of the worm 15 is externally sleeved with a transmission gear 30a, and the circular pillar 100b is provided with a sub-worm 1001 that meshes with the transmission gear 30a and a connecting end 1002 that can be partially inserted into a diamond-shaped pillar 101. The connecting end is a diamond that engages with the diamond-shaped pillar 101, and the sub-worm 1001, the connecting end 1002 and the circular pillar 100b are arranged as an integral structure; the transmission shaft 10b is driven by a motor, to drive the circular pillar 100b to rotate. The worm 15 is driven to rotate through the engagement of the sub-worm 1001 and the transmission gear 30a, and the worm 15 revolves around the turbine 14 while rotating.

Figure 19:
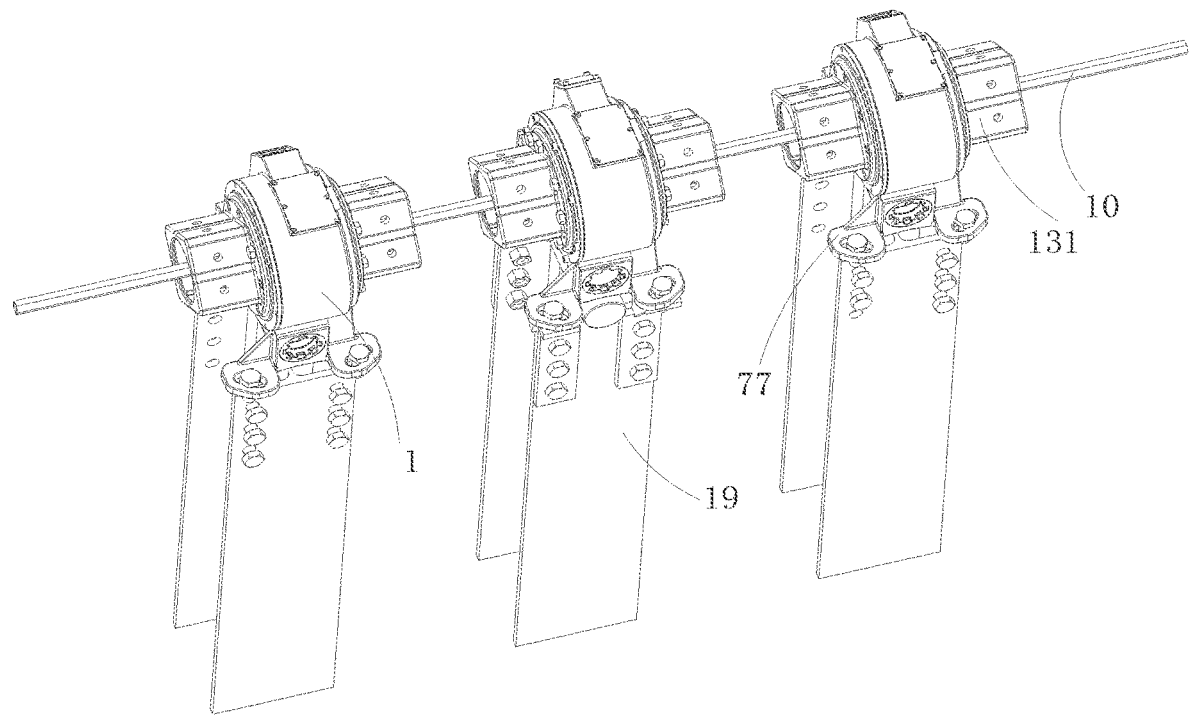
FIG. 19 is a schematic view illustrating the inside arrangement of a transmission shaft of the present invention.

As shown in FIG. 19, in some embodiments, the transmission shaft 10 is positioned inside the main beam 12. The transmission shaft 10 is positioned inside the main beam 12, which reduces the long-term exposure of the transmission shaft 10 to the outside to cause the transmission shaft 10 to be corrosive, so that the service life of the transmission shaft 10 is improved. In addition, because the transmission shaft is provided inside, the appearance and layout of the entire equipment is more concise and beautiful.

As shown in FIG. 21 and FIGS. 5 to 26, in some embodiments, the slewing reducer 1 is provided with a plurality of bevel gear sets, and the transmission shaft 10 drivingly engages with an input end or an output end of the slewing reducer 1 through the plurality of bevel gear sets.

Figure 25:
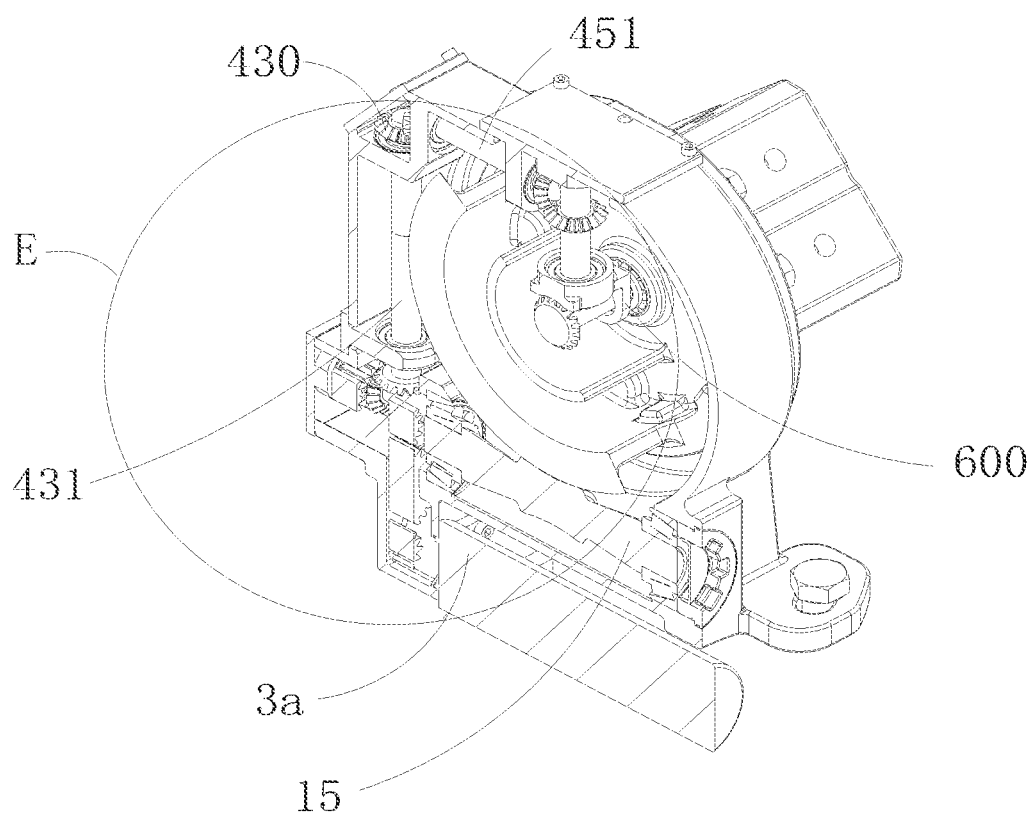
FIG. 25 is a partial sectional view II of a slewing reducer illustrating the inside arrangement of a transmission shaft of the present invention.
Figure 26:
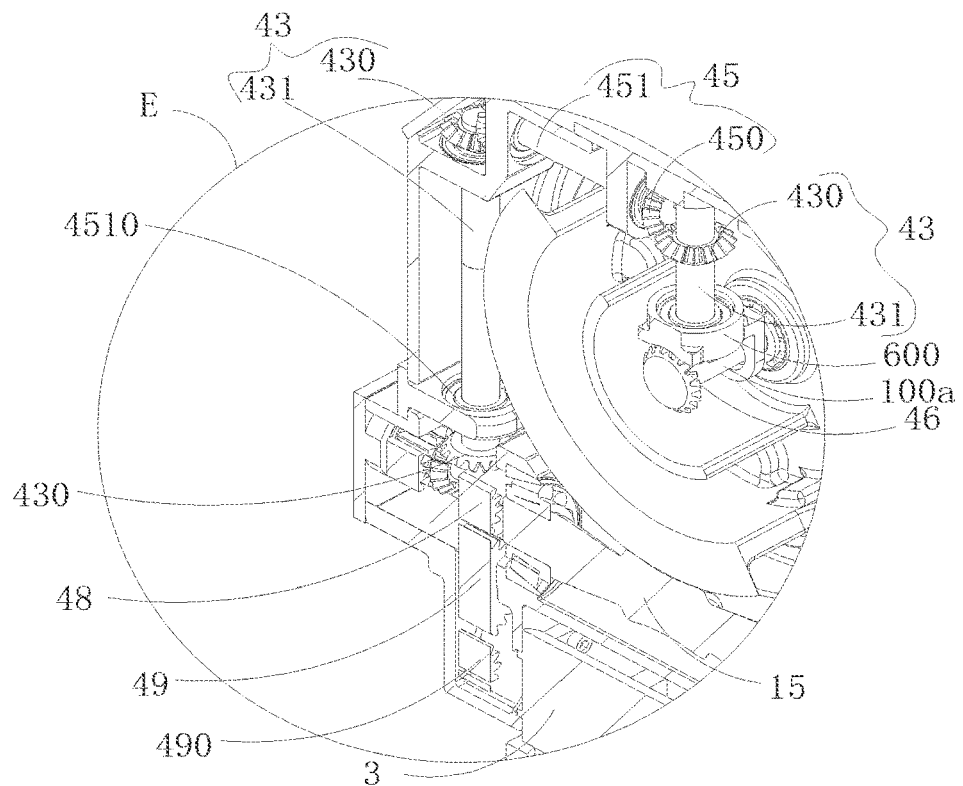
FIG. 26 is an enlarged view of a structure at E in FIG. 25.
Figure 27:
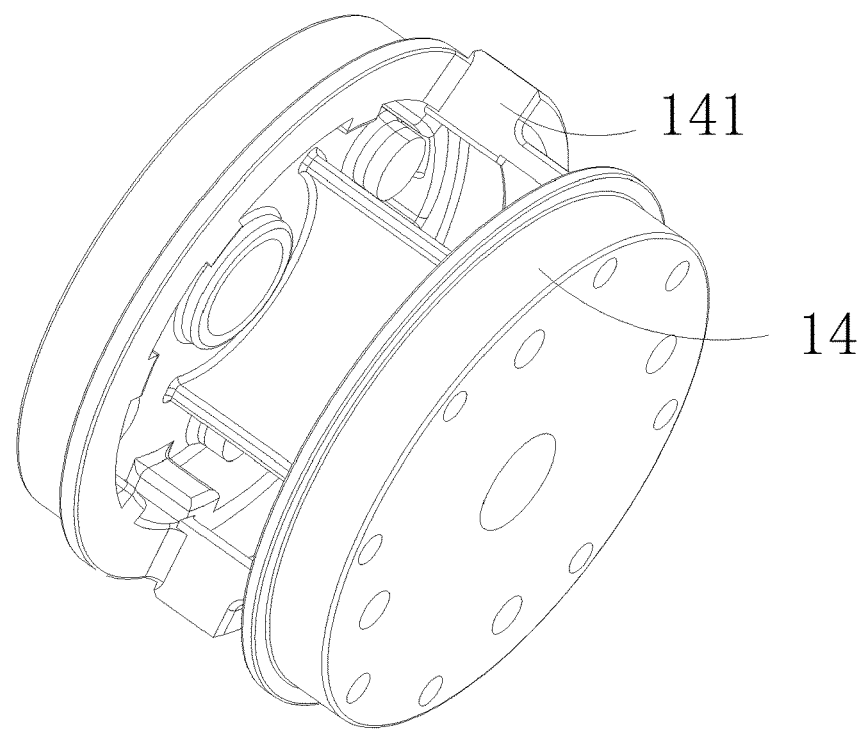
FIG. 27 is a schematic view of a worm gear illustrating the inside arrangement of a transmission shaft of the present invention.
Figure 28:
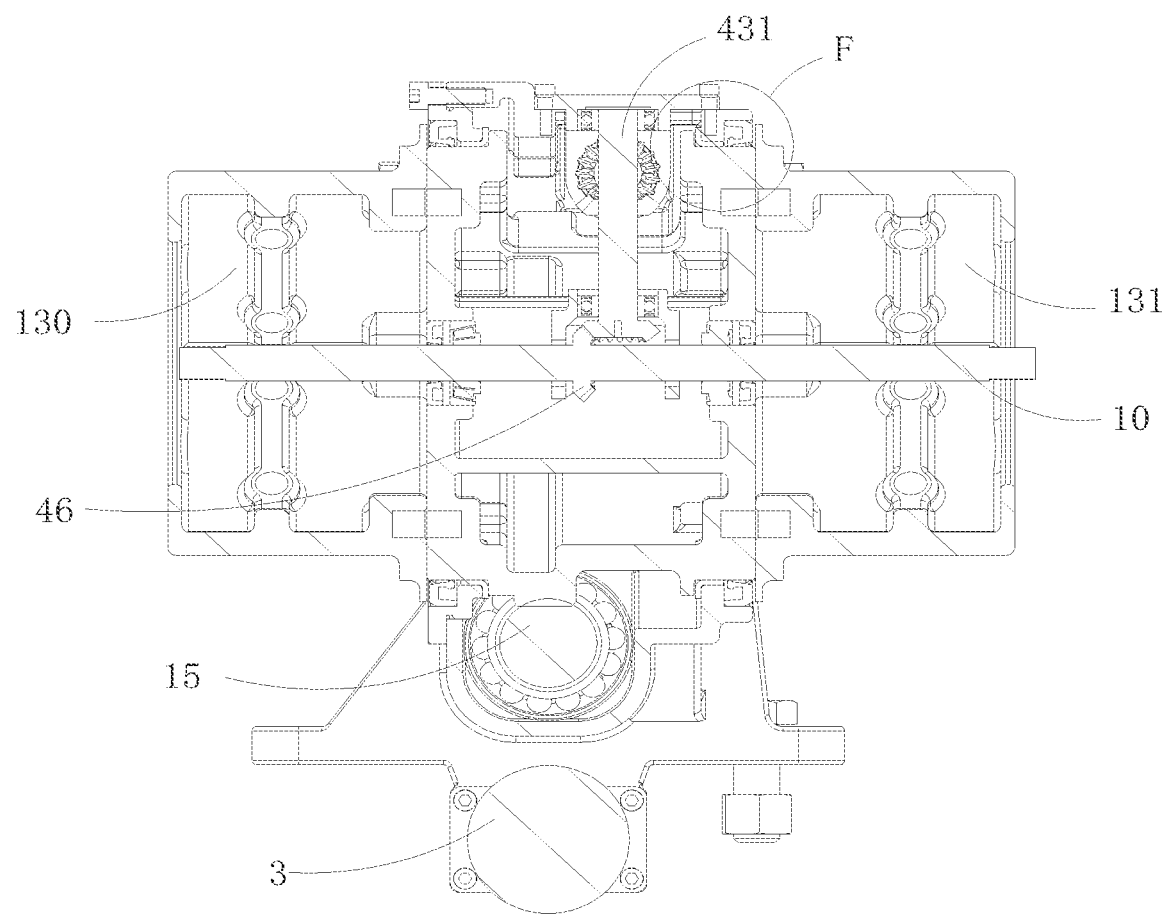
FIG. 28 is a partial sectional view III of a slewing reducer illustrating the inside arrangement of a transmission shaft of the present invention.
Figure 29:
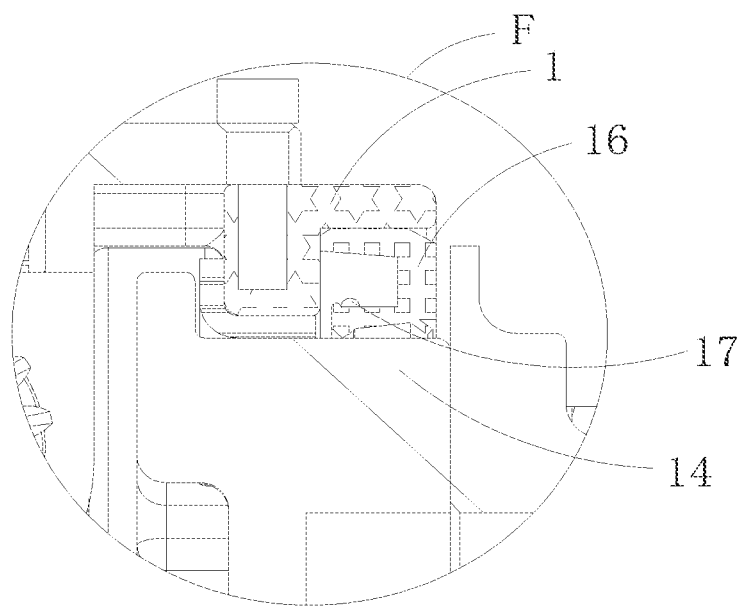
FIG. 29 is an enlarged view of a structure at F in FIG. 28.

As shown in FIGS. 25 and 26, in some embodiments, a first bevel gear set 43, a second bevel gear set 44 and a third bevel gear set 45 are provided inside the slewing reducer 1, the circular pillar 100a inside the transmission shaft 10 is externally sleeved with a fourth bevel gear 46, and one end of the first bevel gear set 43 meshes with the input end or output end of the slewing reducer 1, one end of the third bevel gear set 45 meshes with the fourth bevel gear 46, and the two ends of the second bevel gear set 44 mesh with the other ends of the first bevel gear set 43 and the third bevel gear set 45, respectively. Specifically, the first bevel gear set 43 is composed of a first bevel gear 430 and a first transmission rod 431. The first bevel gear 430 is provided in pair. The first transmission rod 431 is configured to connect a pair of first bevel gears 430; the second bevel gear set 44 is composed of a pair of second bevel gears 440 and a second transmission rod 441. The second bevel gear 440 is provided in pair. The second transmission rod 441 is configured to connect a pair of second bevel gears 440; the third bevel gear set 45 is composed of a pair of third bevel gears 450 and a third transmission rod 451. The third bevel gear 450 is provided in pair. The third transmission rod 451 is configured to connect a pair of third bevel gears 450. Optionally, the input end or output end of the slewing reducer 1 is sleeved on a pair of fifth bevel gears 48 outside of one end of the worm 15, a sixth bevel gear 49 that meshes with one of the fifth bevel gears 48 and a seventh bevel gear 490 that meshes with the sixth bevel gear 49. The seventh bevel gear 490 is connected to the input end of the motor 3, and the fifth bevel gear 48 meshes with one of the first bevel gears 430; specifically, the first transmission rod 431, the second transmission rod 441 and the third transmission rod 451 are all provided with a third bearing 4510 that is connected to the shell of the slewing reducer. Optionally, the third bearing 4510 of the third transmission rod 451 is externally sleeved with a connecting base 600 that is connected to the transmission shaft 10. The two ends of the connecting base 600 have supports extending outwardly. The supports are provided with through-holes. The transmission shaft 10 is provided through the through-holes. The arrangement of the connecting base 600 can provide a stable supporting on the transmission shaft 10, ensuring that the transmission shaft 10 can rotate stably.

Figure 30:
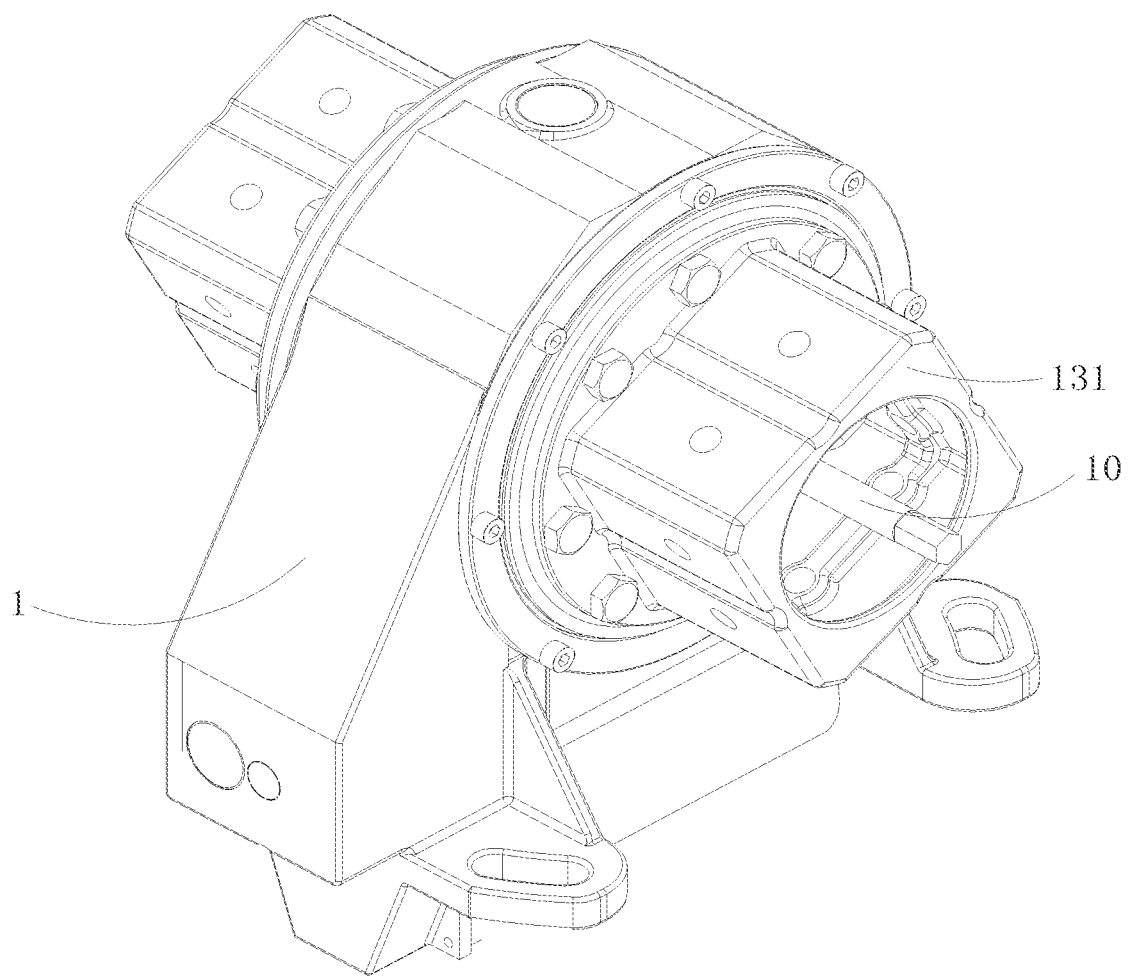
FIG. 30 is a schematic view of a slewing reducer illustrating the inside arrangement of a transmission shaft according to the second embodiment of the present invention.
Figure 31:
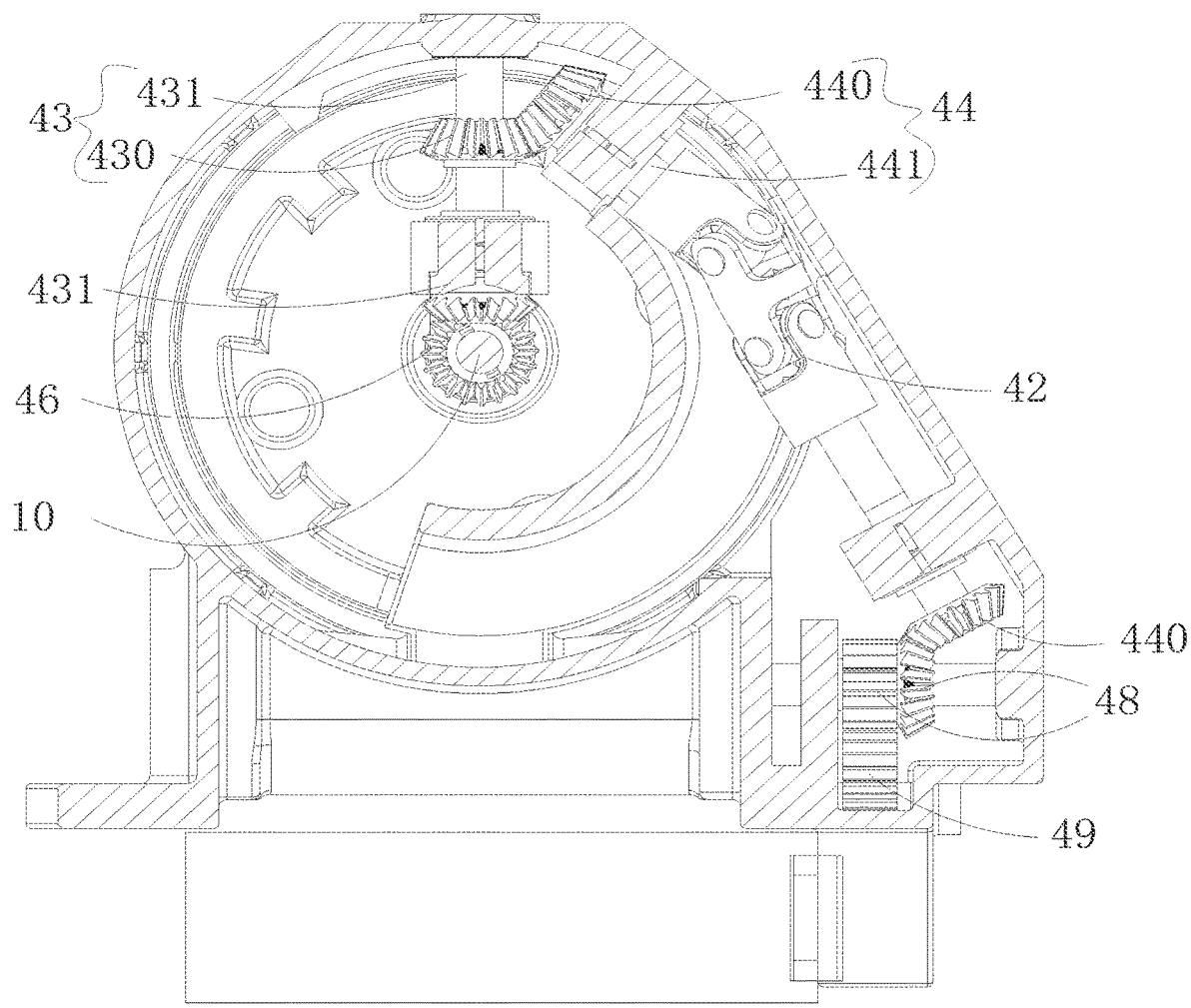
FIG. 31 is a partial sectional view of a slewing reducer illustrating the inside arrangement of a transmission shaft according to the second embodiment of the present invention.

Optionally, as shown in FIGS. 30 and 31, in other embodiments, a first bevel gear set 43 and a second bevel gear set 44 are provided inside the slewing reducer 1, the transmission shaft 10 is externally sleeved with a fourth bevel gear 46, the first bevel gear set 43 meshes with the fourth bevel gear 46, and one end of the second bevel gear set 44 meshes with the input end or output end of the slewing reducer 1, and the other end of the second bevel gear set meshes with the first bevel gear set 43; Specifically, the first bevel gear set 43 is composed of a pair of first bevel gears 430 and a first transmission rod 431. The first bevel gear 430 is provided in pair. The first transmission rod 431 is configured to connect a pair of first bevel gears 430; the second bevel gear set 44 is composed of a pair of second bevel gears 440 and a second transmission rod 441. The second bevel gear 440 is provided in pair. The second transmission rod 441 is configured to connect a pair of second bevel gears 440. The universal joint 42 is provided on the second bevel gear set 44. Optionally, the input end or output end of the slewing reducer 1 is composed of a pair of fifth bevel gears 48 sleeved outside of one end of the worm 15 and a sixth bevel gear 49 that meshes with one of the fifth bevel gears 48. The sixth bevel gear 49 is connected to the input end of the motor 3, and the other fifth bevel gear 48 meshes with one of the second bevel gears 440. Specifically, both the first transmission rod 431 and the second transmission rod 441 are provided with a third bearing that is connected to the inside of the shell. Optionally, the third bearing of the second transmission rod 441 is externally sleeved with a connecting base 600 connected to the transmission shaft 10. The connecting base 600 are provided with supports extending outwardly. The supports are provided with through-holes. The transmission shaft 10 is provided through the through-holes. The arrangement of the connecting base 600 can provide a stable supporting on the transmission shaft 10, ensuring that the transmission shaft 10 can rotate stably.

As shown in FIGS. 21, 25 and 28 to 29, in some embodiments, the slewing reducer 1 is a worm gear 14 slewing reducer 1. The worm gear 14 of the slewing reducer 1 is integrally formed with a first connecting column 130 and a second connecting column 131. The main beam 12 on the left side of the slewing reducer 1 is connected to the first connecting column 130, and the main beam 12 on the right side of the slewing reducer 1 is connected to the second connecting column 131. With the integrated arrangement of the second connecting column and the shell, the processing is more convenient, sufficient strength and rigidity can be guaranteed, and safety can be ensured. Specifically, a sealing ring 16 is provided at the joint between the worm gear 14 and the shell, and the joint between the worm gear 14 and the transmission shaft 10. The sealing ring 16 can be made of materials with good weather resistance, such as rubber, steel plate, etc. The materials with good weather resistance can block the direct sunlight to the sealing ring 16, delay the aging of the seals and increase the service life. The sealing ring 16 is U-shaped, and the sealing ring 16 is provided with a circle of convex rib 17. The sealing ring 16 can prevent external dust from entering and has a certain dustproof effect. In addition, when the sealing ring 16 is inserted between the shell and the worm gear 14, the sealing ring 16 and the worm gear 14 are fixed through the convex rib 17, which ensures the stability of the worm gear 14 when rotating. Optionally, both sides of the shell are provided with self-lubricating bearings to engage with the worm gear 14. The self-lubricating bearings can be connected with the shell by one end cover, and the end cover and the two sides of the shell are connected in the form of bolts and nuts. The outer diameter of the worm gear 14 is in fit with the self-lubricating bearing and can rotate in the self-lubricating bearing. It can bear a great radial load. At the same time, the bearing flange can bear a certain axial load. When one bearing is the fulcrum and a moment is generated with the other bearing, the two bearings can withstand a certain overturning load when they are in fit.

As shown in FIG. 7, in some embodiments, the lower part of the shell of the slewing reducer 1 is provided with a mounting position 34 for the motor 3 to be placed. The motor 3 is controlled by the motor controller, and the motor controller is connected to the motor 3 by a cable. The motor 3 and the motor controller are in a relatively static state. The relatively static state is that an object keeps the position unchanged relative to another reference object. It is a relatively movable and relatively static, and the motion and static are relative.

As shown in FIGS. 1 and 2, in some embodiments, the motor controller is provided on the main beam 12.

Figure 20:
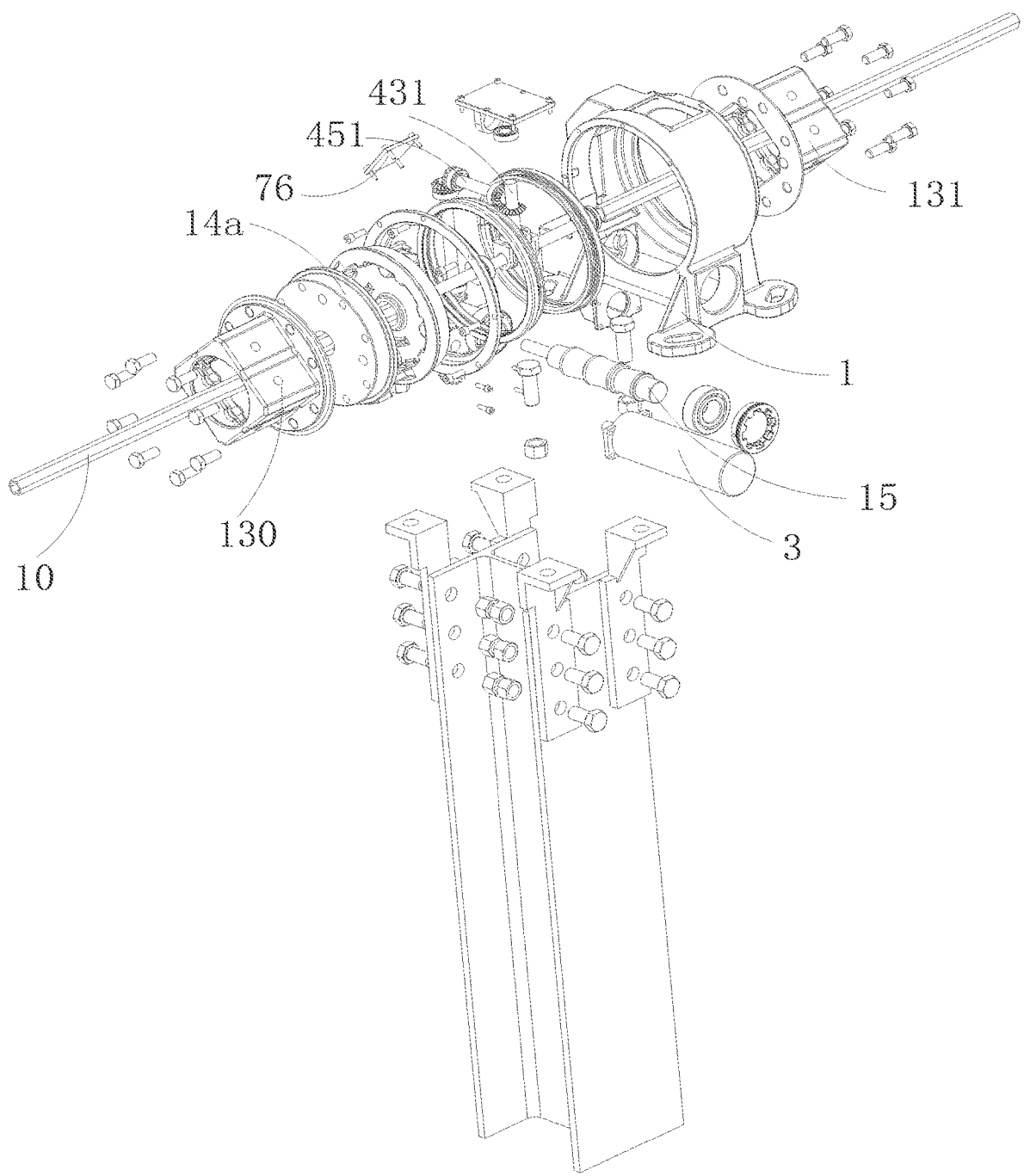
FIG. 20 is an exploded view illustrating the inside arrangement of a transmission shaft of the present invention.

Preferably, as shown in FIGS. 19 and 20, in some embodiments, the motor controller is provided on the column 19.

Preferably, as shown in FIGS. 23 to 34, in some embodiments, the motor 3b is disposed at the lower part of the shell of the slewing reducer 1, the motor 3b and the shell of the slewing reducer 1 are on the same vertical plane, and the motor 3b is arranged in parallel with the worm of the slewing reducer 1, the motor output end is connected to the worm by gear drive. The gear transmission is a prior art. The intermesh between the gears transmits the power to the worm. The parallel arrangement in the same horizontal plane can reduce the space occupancy rate and make the entire slewing reducer more beautiful.

Figure 32:
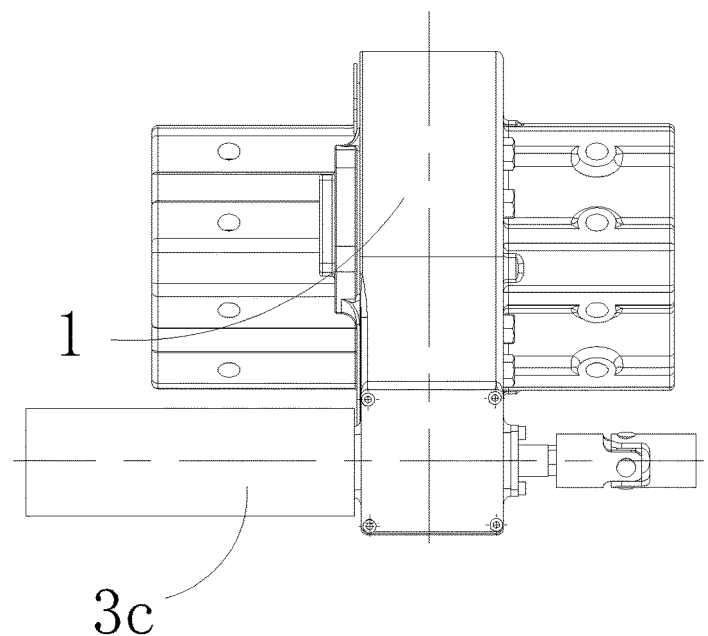
FIG. 32 is a schematic view illustrating a second mounting method of a motor arranged on the left side of a shell of a slewing reducer of the present invention.
Figure 33:
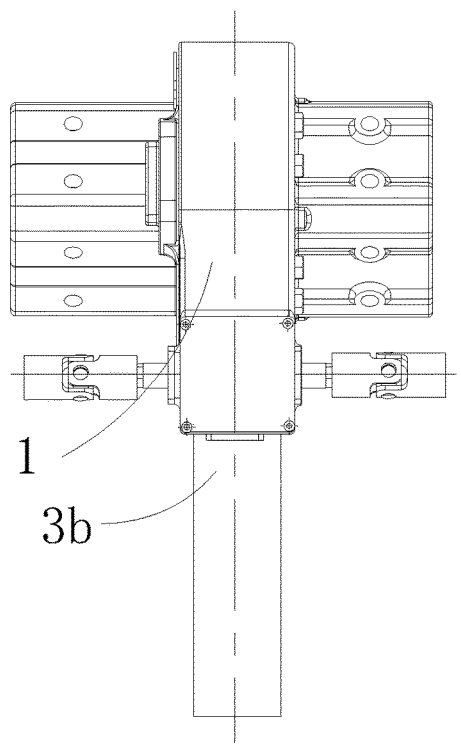
FIG. 33 is a schematic view I illustrating a third mounting method in which a motor and a worm are on the same plane and arranged vertically in the present invention.
Figure 34:
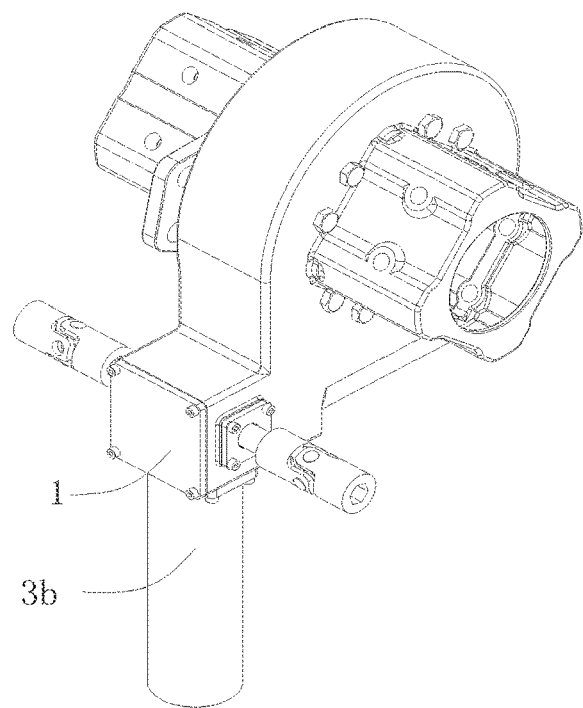
FIG. 34 is a schematic view II illustrating a third mounting method in which a motor and a worm are on the same plane and arranged vertically in the present invention.

Preferably, as shown in FIG. 32, in some embodiments, the motor 3c is disposed on the left side of the lower part of the shell of the slewing reducer 1, and the left side is arranged relative to the slewing reducer, and the motor 3c is arranged perpendicularly to the worm of the slewing reducer 1. The motor output end is connected to the worm through a gear transmission. The gear transmission is a prior art, which is the meshing between gears and gears to transmit power to the worm. The perpendicular arrangement on the left side guarantees the transmission of multiple layers between gear and gear, making the transmission power to be more stable.

Figure 35:
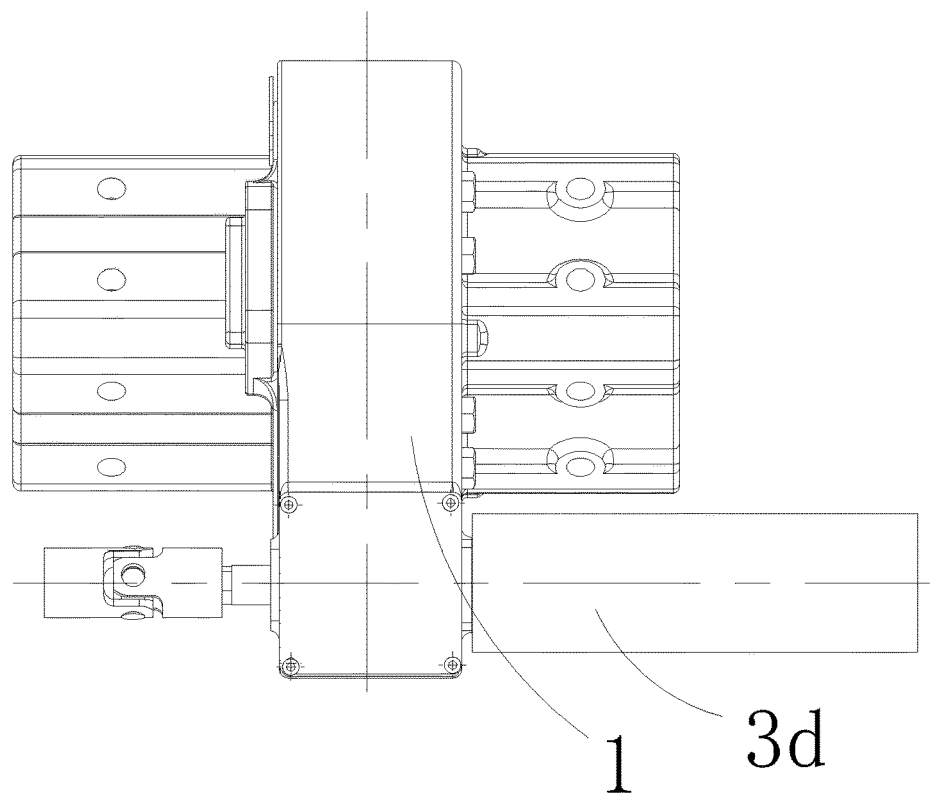
FIG. 35 is a schematic view illustrating a fourth mounting method of a motor arranged on the right side of a shell of a slewing reducer of the present invention.

Preferably, as shown in FIG. 35, in some embodiments, the motor 3d is disposed on the right side of the lower part of the shell of the slewing reducer 1, and the right side is arranged relative to the slewing reducer, and the motor 3d is arranged perpendicularly to the worm of the slewing reducer 1. The motor output end is connected to the worm through a gear transmission. The gear transmission is a prior art, which is the meshing between gears and gears to transmit power to the worm. The perpendicular arrangement on the left side guarantees the transmission of multiple layers between gear and gear, making the transmission power to be more stable.

Figure 21:
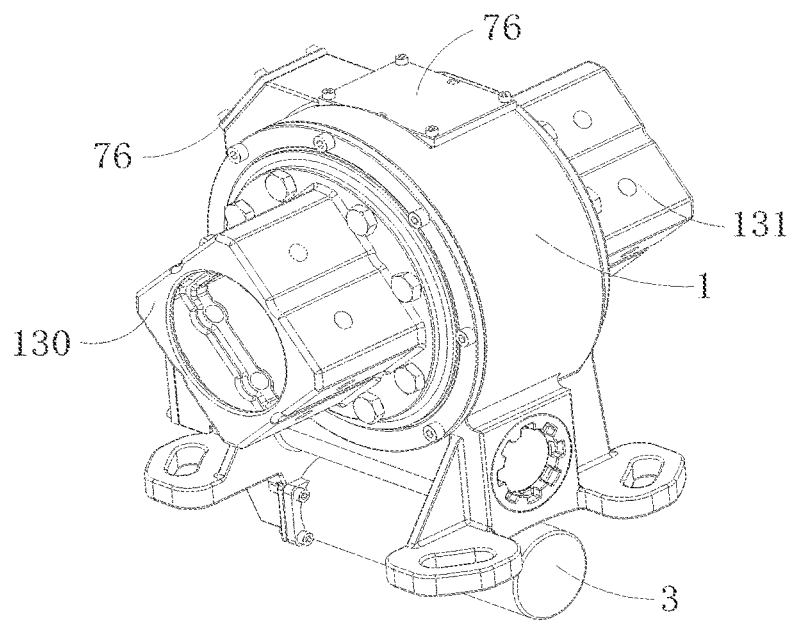
FIG. 21 is a schematic view of a slewing reducer illustrating the inside arrangement of a transmission shaft of the present invention.
Figure 22:
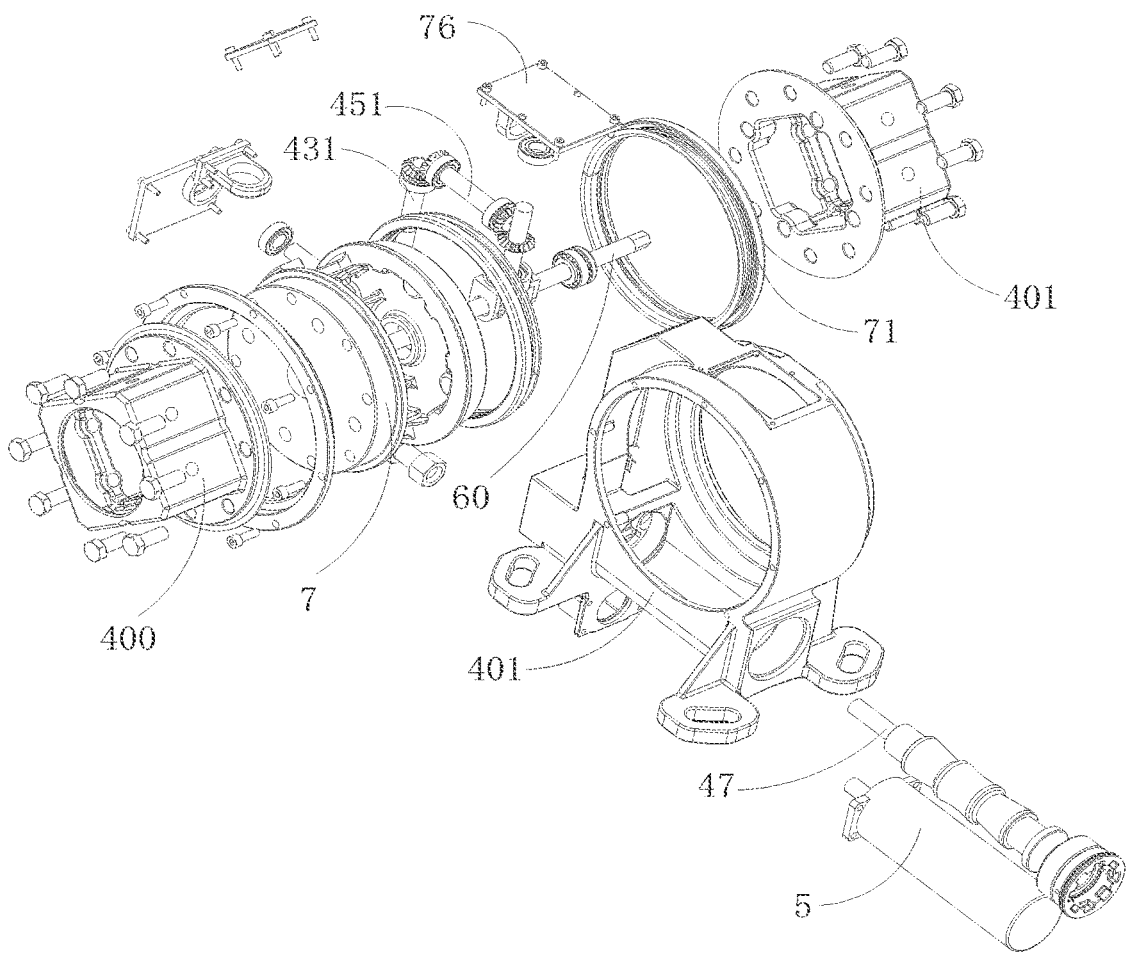
FIG. 22 is an exploded view of a slewing reducer illustrating the inside arrangement of a transmission shaft of the present invention.

As shown in FIGS. 19 to 21, in some embodiments, the motor controller and the shell of the slewing reducer 1 are disposed on the main beam. The motor controller is mounted on the main beam, so that the main beam drives the motor controller and the shell to rotate. The shell rotation also drives the motor 3 to rotate, which ensures that when the rotation is synchronized in the same direction, it will also drive the connected lines to rotate together, so the line needs not to be very long and needs to be simplified. During the rotation, the line will not be knotted and wound. The simple arrangement between lines makes the entire appearance of the equipment to be more beautiful.

As shown in FIGS. 2 and 8, optionally, both the motor 3 controller and the shell of the slewing reducer 1 are disposed on the column 19. By mounting on column 19 through the shell and the motor 3 controller, the line of the motor 3 and the motor 3 controller needs not to be very long, so the line needs not to be very long and needs to be simplified. During the rotation, the line will not be knotted and wound. The simple arrangement between lines makes the entire appearance of the equipment to be more beautiful.

As shown in FIG. 21, in some embodiments, the motor 3 and the worm 15 are arranged in parallel.

Figure 4:
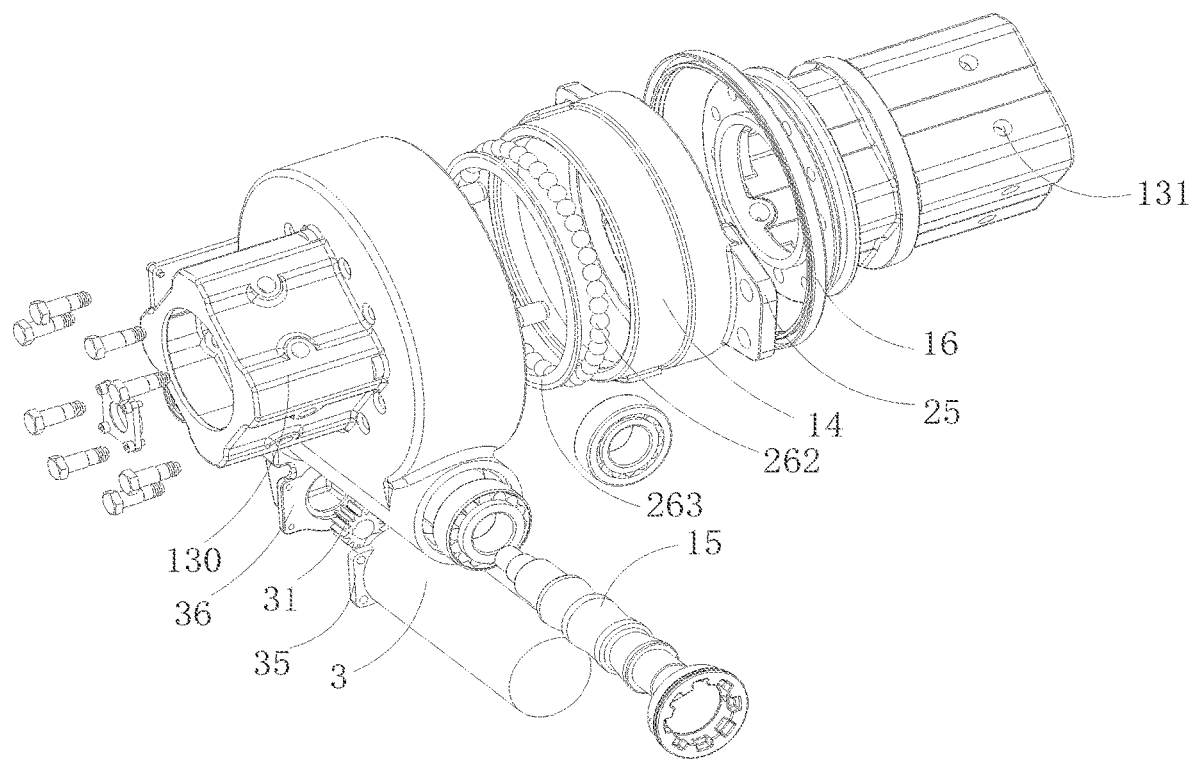
FIG. 4 is an exploded view of a slewing reducer of the present invention.

As shown in FIG. 4, in some embodiments, a support lug 35 is provided on the shell of the motor 3, and a support portion 36 connected to the support lug 35 is provided on the shell of the slewing reducer. The support lug 35 and the support portion 36 can be fixed in the form of bolts and nuts, so that the motor 3 is firmly arranged on the shell of the slewing reducer 1.

As shown in FIG. 8, in some embodiments, the shell of the slewing reducer 1 is provided with a first limiting portion 141, and the worm gear 14 is circumferentially provided with a second limiting portion 140 that engages with the first limiting portion 141.

Figure 23:
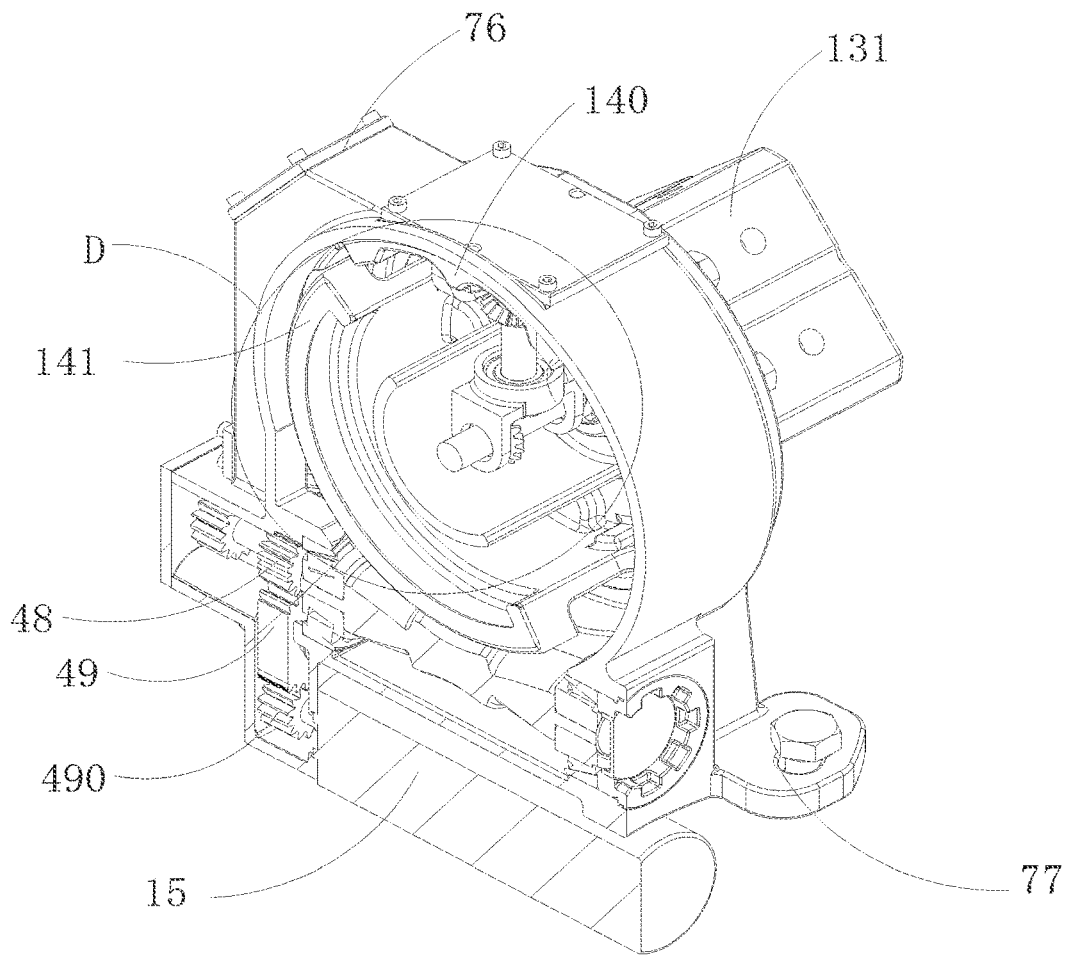
FIG. 23 is a partial sectional view I of a slewing reducer illustrating the inside arrangement of a transmission shaft of the present invention.
Figure 24:
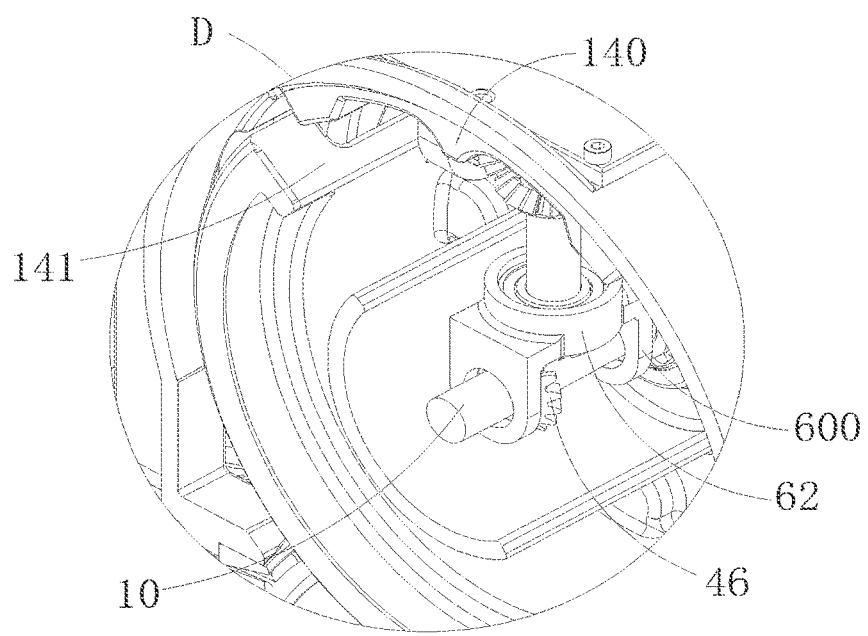
FIG. 24 is an enlarged schematic diagram of a structure at D in FIG. 23.

As shown in FIGS. 23 and 24, in some embodiments, the shell of the slewing reducer 1 is provided with a first limiting portion 141, and the worm gear 14 is circumferentially provided with a second limiting portion 140 that engages with the first limiting portion 141. The arrangement of the first limiting portion 141 and the second limiting portion 140 ensures that the slewing reducer 1 has a higher stability during rotation. Furthermore, such arrangement ensures a higher safety protection capability in the event of failure of the external limit switch.

As shown in FIGS. 23 and 24, in some embodiments, the first limiting portion 141 is provided for at least two lobes. The lobes are fixedly connected to the top inside the shell of the slewing reducer 1. The second limiting portion 140 is provided for a convex ring, and the convex ring is fixedly connected to the circumferential direction of the worm gear 14.

As shown in FIGS. 23 and 24, in some embodiments, the convex ring is provided in half of the circumferential direction of the worm gear 14, namely, one-half circle. When the worm gear 14 rotates, the convex ring also rotates. At this time, one of the lobes abuts against the incomplete convex ring, to limit the rotation of the worm gear 14. Specifically, a plurality of cover plates 76 are provided on the shell of the slewing reducer 1. The cover plates 76 can be connected to the shell of the slewing reducer 1 in the form of bolts and nuts. Through the arrangement of the cover plate 76, a relative airtightness of the shell of the slewing reducer 1 makes it difficult for external dust to enter the shell of slewing reducer 1, ensuring the stability of the internal mechanical operation of the shell of slewing reducer 1. Optionally, a leg 77 that is connected to the column 19 is provided outside of the shell of the slewing reducer 1, and the leg 77 can also be configured to fix the shell 70 in the form of a bolt and a nut.

Figure 36:
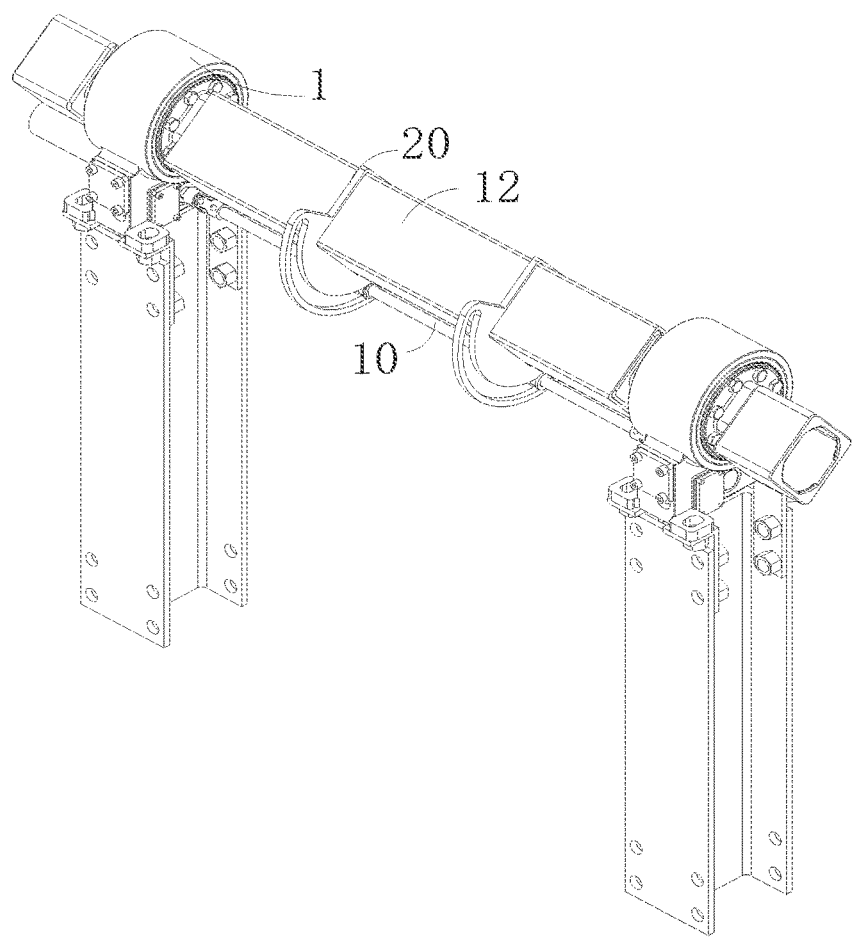
FIG. 36 is a schematic view illustrating the first embodiment in which a connecting member and a transmission shaft of the present invention are connected.
Figure 37:
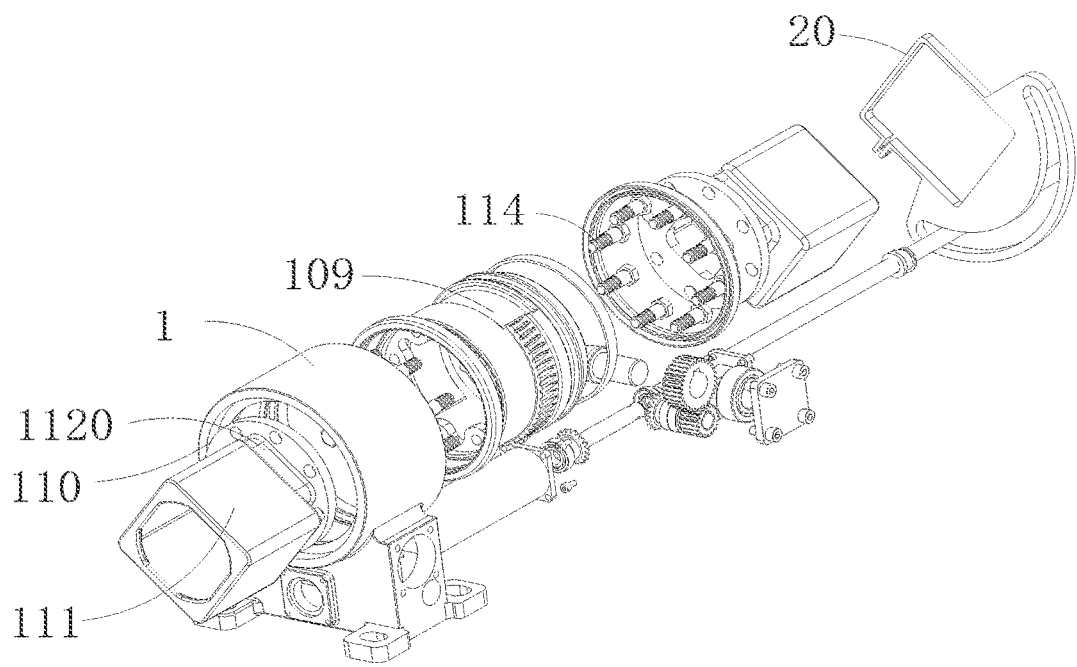
FIG. 37 is an exploded view illustrating the first embodiment in which a connecting member and a transmission shaft of the present invention are connected.

As shown in FIGS. 36 and 37, in some embodiments, the connecting member 20 rotatably engages with the transmission shaft 10 through a self-lubricating bearing. The self-lubricating bearing is a prior art and will not be described here again. The connecting member 20 is connected to the main beam 12 through the sliding rail, and the connecting member 20 can slide on the sliding rail. With the arrangement of the sliding rail and connecting member, the main beam drives the slip ring of the transmission shaft to rotate; the rotations of the main beam and the transmission shaft do not interfere with each other, and both of them can rotate freely within a limited range.

Figure 42:
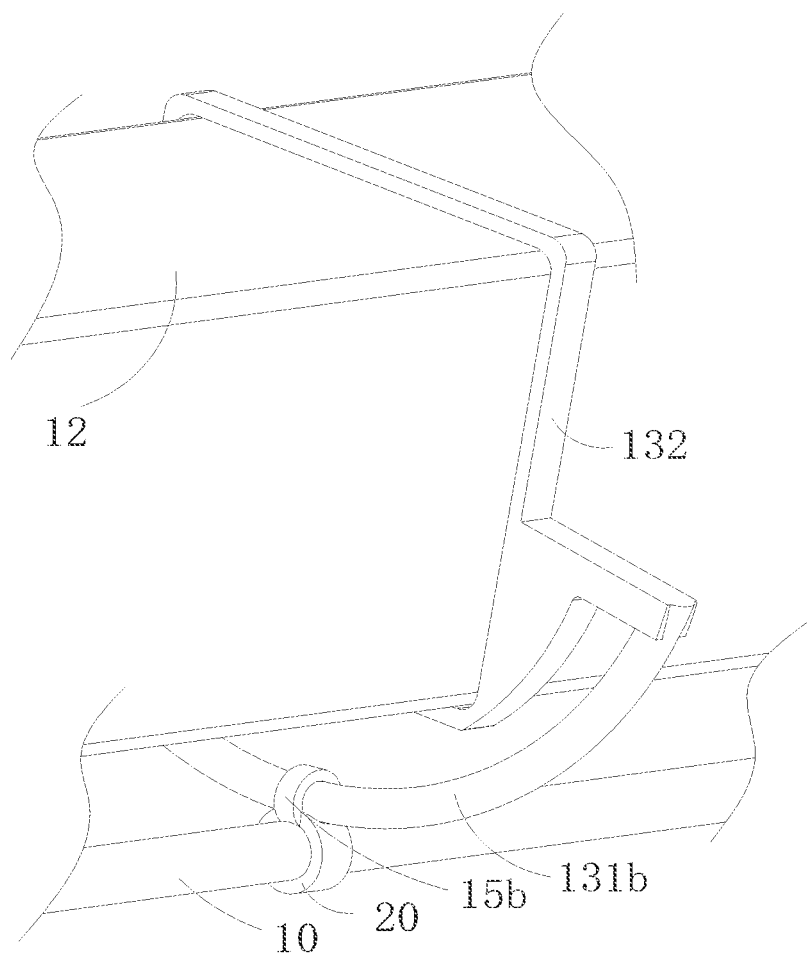
FIG. 42 is a partial schematic view of the second embodiment in which a connecting member and a transmission shaft of the present invention are connected.
Figure 43:
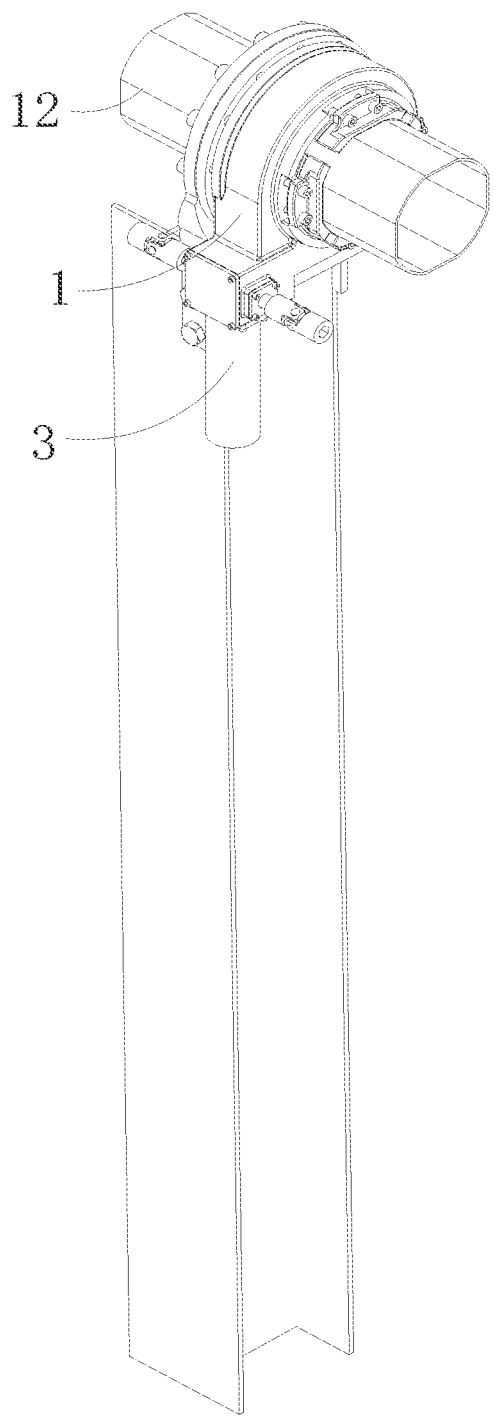
FIG. 43 is a schematic view of the first embodiment of a retaining member of the present invention.
Figure 44:
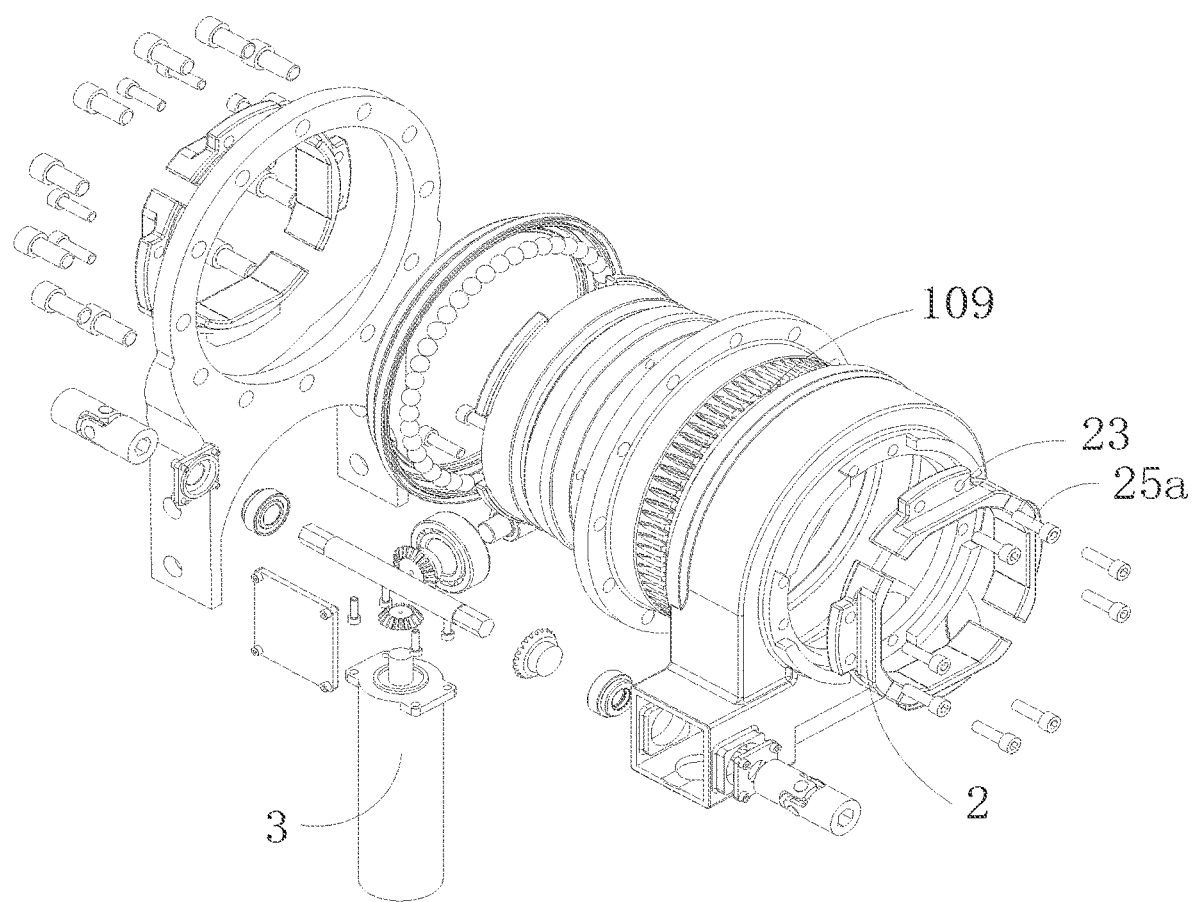
FIG. 44 is an exploded view of the first embodiment of a retaining member of the present invention.

As shown in FIG. 42, in some embodiments, the connecting member 20 slides outside the sliding rail 131.

As shown in FIG. 42, in some embodiments, a slip ring 15b is provided on the connecting member 20, and the slip ring 15b is sleeved on the outside of the sliding rail 131, and the slip ring 15b moves along the trajectory of the sliding rail 131.

Figure 38:
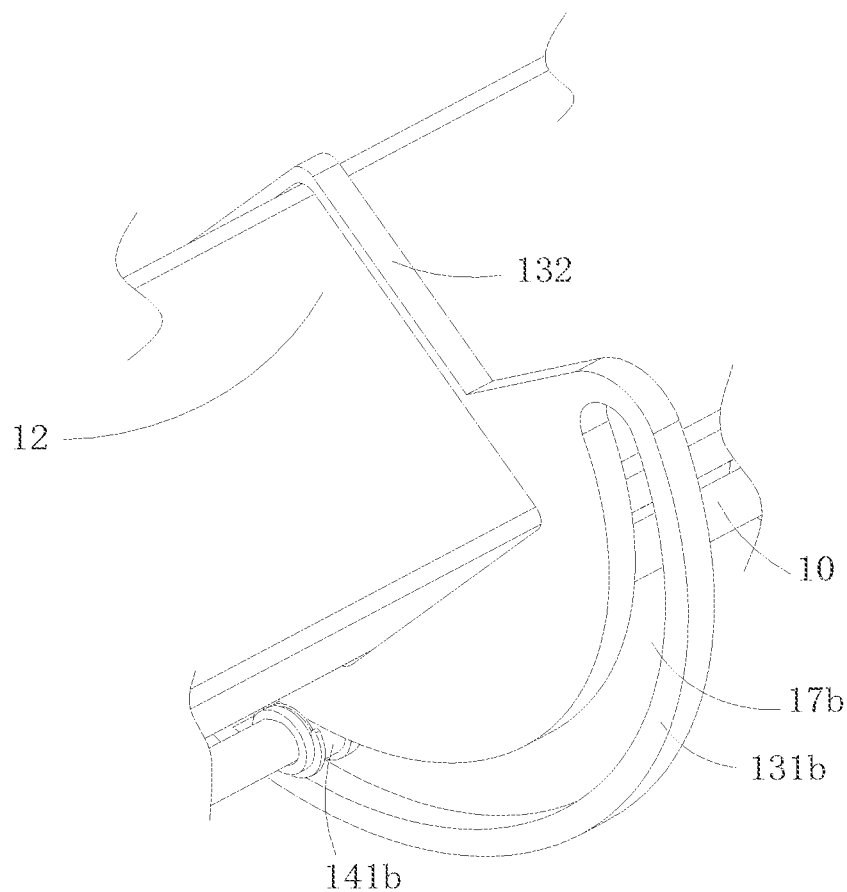
FIG. 38 is a partial schematic view illustrating the first embodiment in which a connecting member and a transmission shaft of the present invention are connected.

As shown in FIG. 38, preferably, in some embodiments, the connecting member 20 slides inside the sliding rail 131.

As shown in FIG. 38, preferably, in some embodiments, an annular chute 141 is provided outside the connecting member 20, an annular groove 17b that engages with the annular chute is provided inside the sliding rail 131, and the annular chute 141 can slide in the annular groove 17b.

As shown in FIG. 38, in some embodiments, the sliding rail 131 is arranged in a circular arc shape, the sliding rail 131 is provided with a frame 132 consistent with the shape of the main beam 12, and the main beam 12 is provided through the interior of the frame 132. Specifically, a pair of support portions extending outwardly is provided on the frame 132, and the pair of support portions can be fixed by bolts and nuts.

Figure 39:
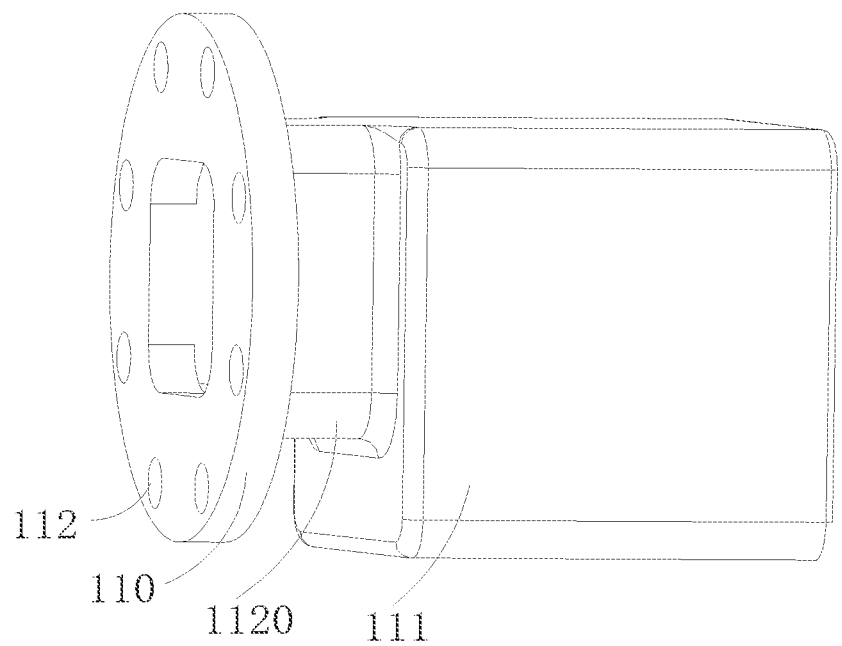
FIG. 39 is a schematic view of a square shaft of the present invention.
Figure 40:
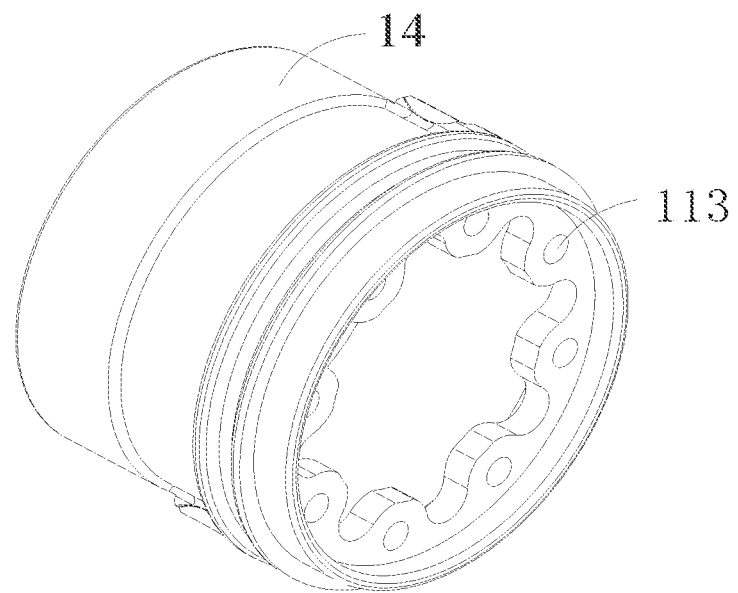
FIG. 40 is a schematic view of a worm gear of the present invention.
Figure 41:
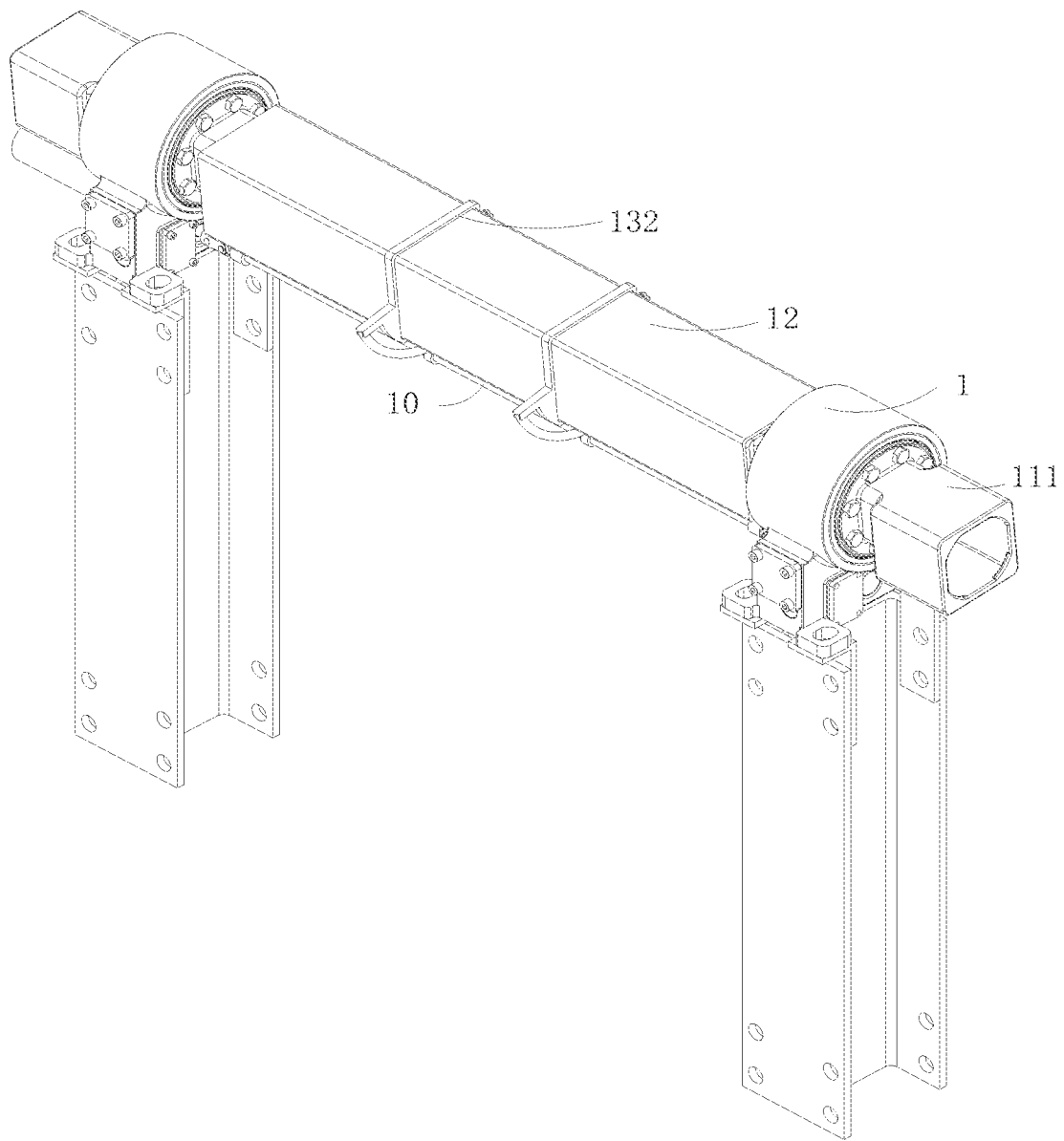
FIG. 41 is the second embodiment in which a connecting member and a transmission shaft of the present invention are connected.

As shown in FIG. 39, in some embodiments, both ends of the worm gear 14 are connected to the main beam 12 by a connecting assembly, and the connecting assembly comprises a disc 110, a square shaft 111, and a connecting column 1120 arranged between the disc 110 and the square shaft 111. Specifically, the disc, square shaft, and connecting column are processed into a whole, and the four corners of the square shaft are arc-shaped. The shape of the outer ring of the square shaft is the same as the shape of the inner wall of the main beam.

As shown in FIG. 39, in some embodiments, the square shaft 111 is arranged eccentrically relative the disc 110. Through the eccentric setting, the design size of one end connected with the worm gear is small, which can avoid the interference of the mounted connecting bolt, and the other end has a larger design size, which can match the main beam of larger size, and the eccentric design can reduce the moment arm of the support, that is, reducing the driving torque of the whole support, and effectively reducing the driving energy of the whole support. The disc 110 is provided with a first positioning hole 112, and the worm gear 14 is provided with a second positioning hole 113, and the first positioning hole 112 is in anti-rotation engagement with the second positioning hole 113 through a locking member 114. Specifically, the locking member 114 can be provided as bolts and nuts.

Figure 45:
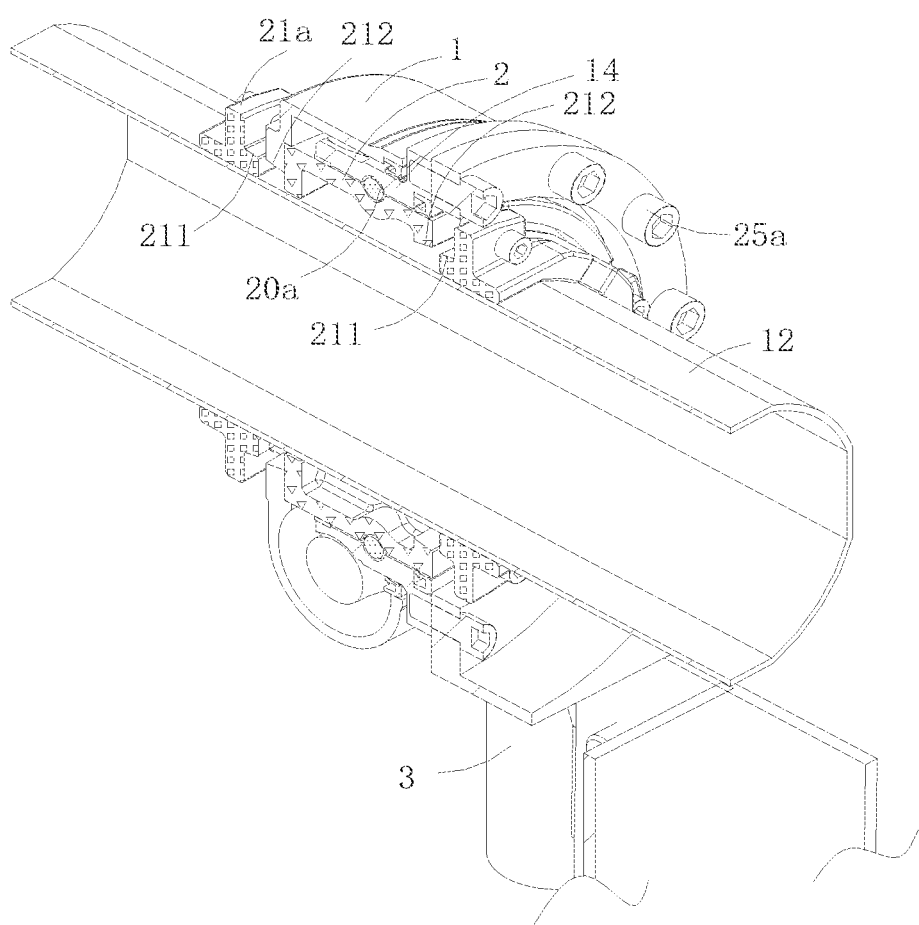
FIG. 45 is a partial sectional view of the first embodiment of a retaining member of the present invention.

As shown in FIG. 45, in some embodiments, the main beam 12 is externally sleeved with a rotating shaft 2, and the rotating shaft 2 engages with the worm gear 14 through a rolling bearing 20a. Specifically, the rolling bearing 20a is a four-point contact ball bearing. The four-point contact ball bearing is a prior art and a separate type of bearing, that is to say, a set of bearings are angular contact ball bearing that can bear bidirectional axial load. It is not described in more details here.

As shown in FIG. 45, in some embodiments, the main beam 12 is connected to the rotating shaft 2 and the shell of the slewing reducer 1 through a retaining member 21a.

Figure 46:
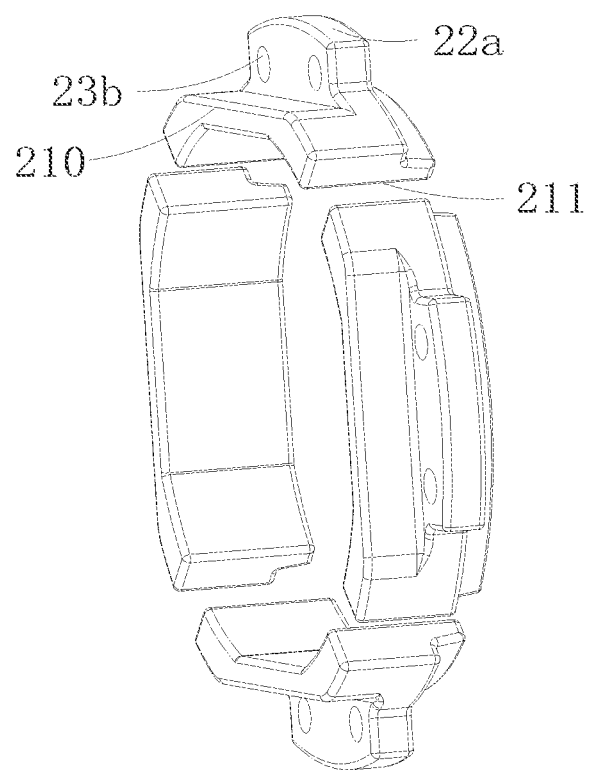
FIG. 46 is a schematic view of a first retaining member of the present invention.
Figure 47:
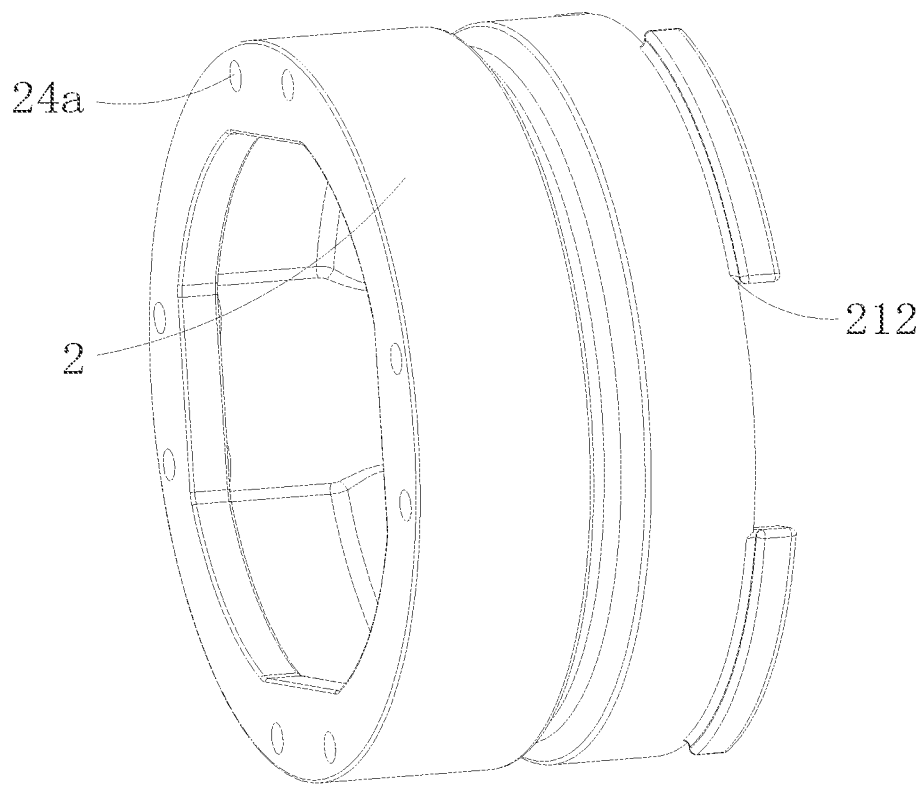
FIG. 47 is a schematic view of a rotating shaft of the present invention.

As shown in FIG. 46, in some embodiments, the retaining member 21a is provided with a convex ring 210 extending outwardly in the axial direction. Specifically, the inner wall of the convex ring 210 matches the outer wall of the main beam 12. The outer wall of the 210 is arranged in an arc shape. In this embodiment, the number of the retaining members 21a is four, and the retaining members are evenly distributed in the circumferential direction of the main beam 12; the outer wall of the convex ring 210 is provided with the first inclined plane 211 from top to the bottom. The rotating shaft 2 and the inner wall of the shell of the slewing reducer 1 are provided with the second inclined plane 212 from bottom to top, and the first inclined plane 211 can move left and right along the second inclined plane 212.

As shown in FIG. 46, the retaining member 21a is provided with a truncated cone 22a extending outwardly in the radial direction, the truncated cone 22a is provided with a first locking hole 23b, both the rotating shaft 2 and the shell of the slewing reducer 1 are provided with a second locking hole 24a, and the first locking hole 23b is in anti-rotation engagement with the second locking hole 24a through a locking member 25a, and the locking member 25a can be provided with bolts and nuts. When the retaining member 21a is axially locked by the locking member 25a and moves, the radial spacing between the four retaining members 21a will shrink and change. The locking force of the screw is changed by the first inclined plane 26a and the second inclined plane 27a to the radial pressure of the retaining member 21 on the main beam 12, to achieve the purpose of locking the torque tube of the main beam 12.

Figure 48:
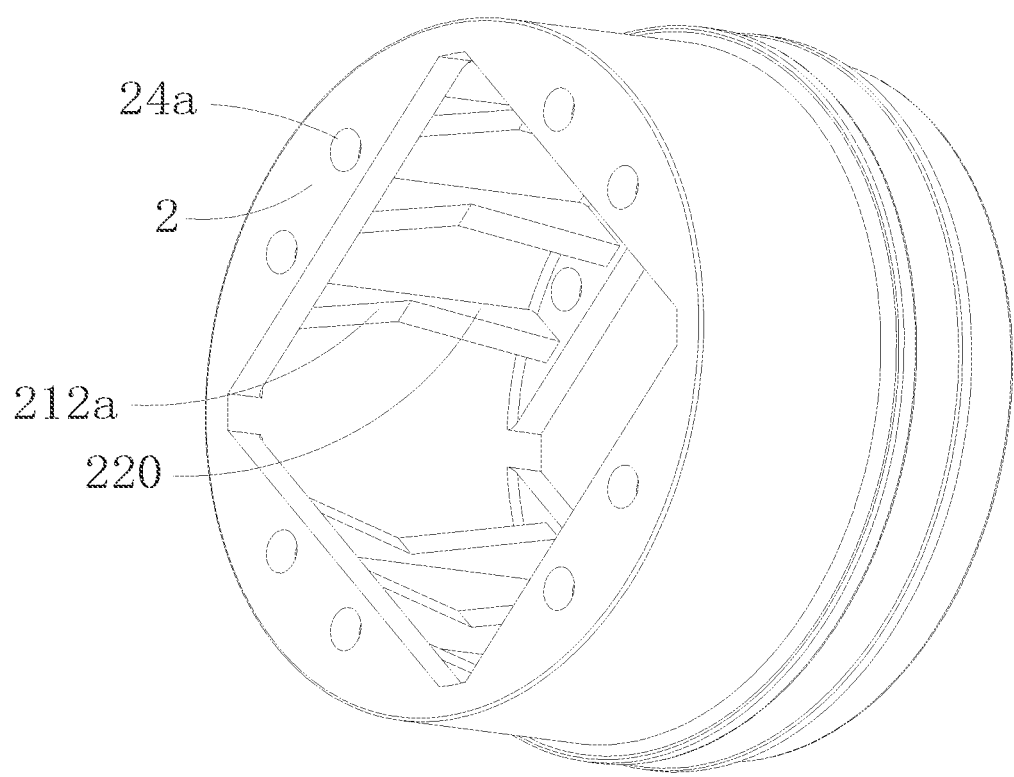
FIG. 48 is a schematic view of a rotating shaft of the present invention.
Figure 49:
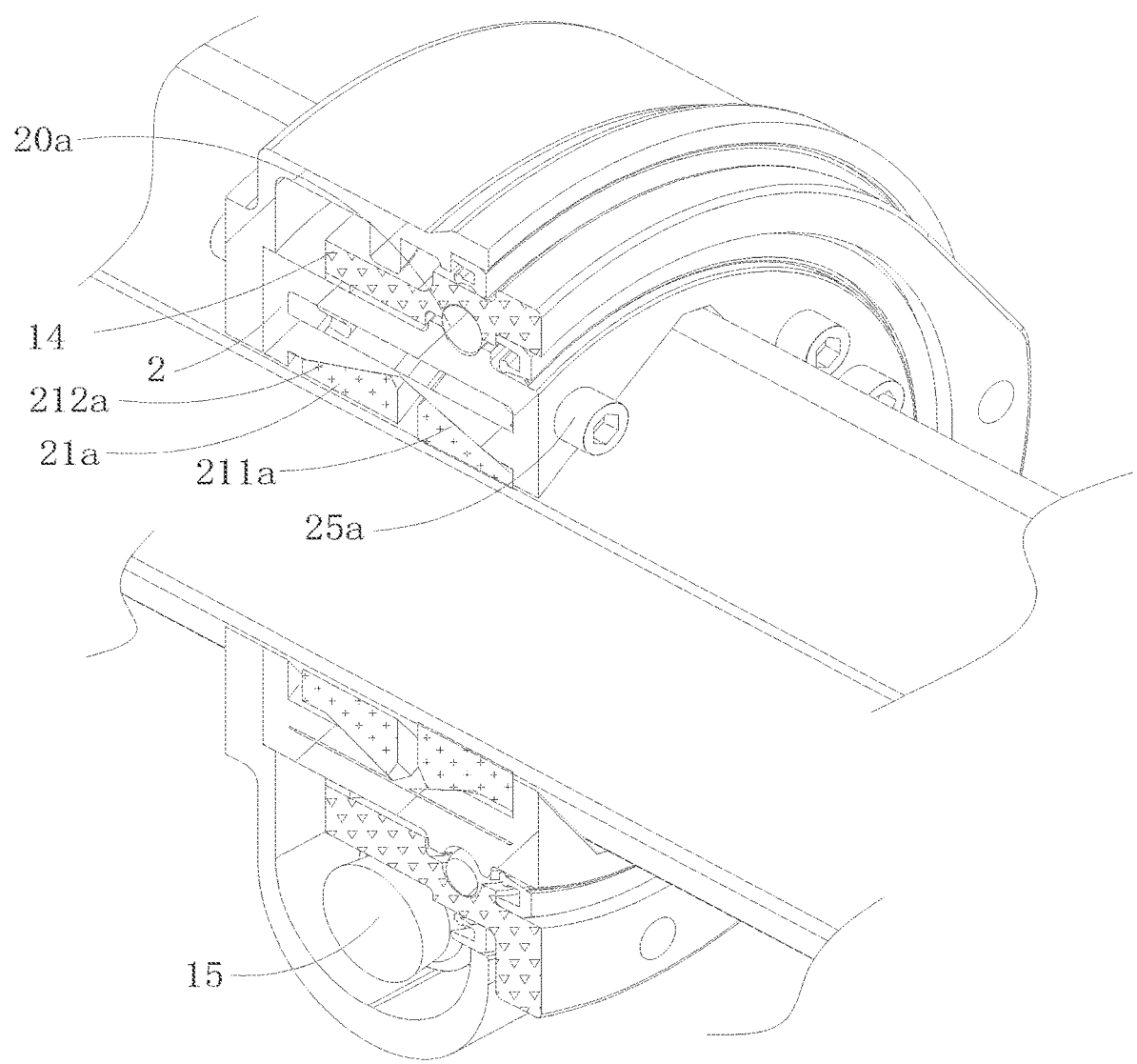
FIG. 49 is a partial sectional view of the second embodiment of a retaining member of the present invention.

As shown in FIGS. 48 and 49, preferably, in some embodiments, a first inclined plane 211a structure is arranged on the outer wall of the retaining member 21a from top to bottom, and the retaining member 21a is arranged in 4 pairs, and are arranged evenly on the left and right sides of the main beam 12 in the circumferential direction. Specifically, the inner wall of the retaining member 21a is a plane, and the surface in contact with the main beam 12 is a plane; the inner wall of the rotating shaft 2 is provided with a plurality of stiffeners 220 extending inwardly in the circumferential direction. The number of stiffeners is 8 to 12, and a second inclined plane 212a structure is arranged on the inner walls of the stiffeners 220 from bottom to top, and the first inclined plane 211a can move left and right along the second inclined plane 212a.

Figure 50:
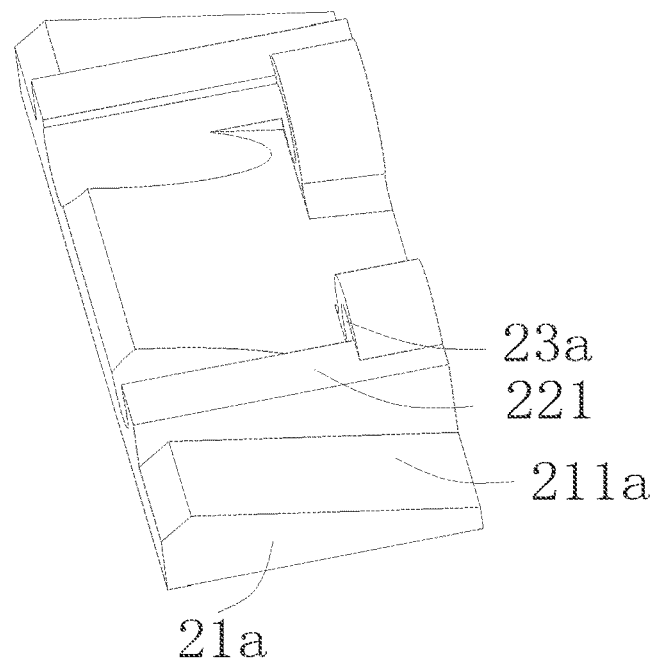
FIG. 50 is a schematic view of a second retaining member of the present invention.

As shown in FIG. 50, preferably, in some embodiments, the retaining member 21a is provided with a boss 221 extending outwardly in the radial direction, the boss 221 is provided with a first locking hole 23a, both the rotating shaft 2 and the shell of the slewing reducer 1 are provided with a second locking hole 24a, and the first locking hole 23a is in anti-rotation engagement with the second locking hole 24a through a locking member 21a. After the main beam passes through the inner hole, the retaining member 21a is pulled to produce axial movement by twisting the locking member 25a. The retaining member 2 and the second inclined plane of the stiffener can change their own radial position through sliding meshing. When the retaining member 2 is moved to the proper position, the distance between the two sets of symmetrical retaining members 2 becomes smaller, and the plane of each retaining member 2 fits with the outer plane of the main beam of the torque tube, so as to achieve the purpose of locking the torque tube of the main beam.

As shown in FIG. 50, in some embodiments, the shape of the inner wall of the retaining member 21a is the same as the shape of the outer wall of the main beam 12.

Of course, as shown in FIGS. 51 to 54, in other embodiments, the shell is provided with a mounting hole 121 for the main beam 12 to pass through, the mounting hole 121 is provided as a polygonal hole. The shape and size of the mounting hole 211 are corresponding to the main beam 12, and the mounting hole 121 has a taper in the length direction; a plurality of retaining members 21b are provided between the main beam 12 and the wall of the mounting hole 121 to restrict the relative positions of the main beam 12 and the side wall of the mounting hole 121. The retaining member 21b is in anti-rotation engagement with the main beam 12 and the inner wall of the mounting hole 121.

Specifically, as shown in FIGS. 52 to 55, the retaining member 21b is provided with at least two flanged portions 213 and a connecting portion 214 that is connected to the flanged portions 213, and an angle is formed between the two flanged portions 213. The angle is corresponding to the angle between the adjacent sides of the main beam 12, and the size of the inner edge of the flanged portion 213 is corresponding to the size near the edge of the main beam 12, and can be completely fit to the main beam 12; the outer edge of the flanged portion 213 is provided with a taper, and the taper and size of the flanged portion 213 are the same as those close to the edge of the mounting hole 121; the connecting portion 214 is connected to the shell by screws; when the main beam 12 is connected to the mounting hole 121, a plurality of retaining members 21b are respectively fit to the edges of the main beam 12 respectively, such that the outer taper of the retaining member 21b is fit to the inner taper of the mounting hole 121, and the connection point of the adjacent flanged portion 213 is corresponding to the edge of the mounting hole 211, and then the screw is screwed to push the retaining member 21b to move axially, and then the retaining member 21b will be stuck into the mounting hole 121 until the surface of the main beam 12 is completely fit to the retaining member 21b, thereby locking the axial and radial directions of the main beam 12. In this mounting method, the main beam 12 passes through the middle of the slewing reducer 1, so a set of flat single-axis main beam 12 can reduce joints to make a single main beam 12 to be longest, thereby reducing the wastage of materials and avoiding the wastage of improper length of the main beam 12 caused by construction error of the column 19 on the site, and reducing the difficulty of on-site construction and improving the installation progress.

Since the flanged portion 213 is completely fit to both sides of the edge of the main beam 12 and squeezes the main beam 12, the strength near the edge of the main beam 12 in the present invention is greater than the strength of the side of the main beam 12, avoiding the deformation of the main beam 12 caused by small joint surface and improving the anti-deformation ability of the main beam 12.

Figure 53:
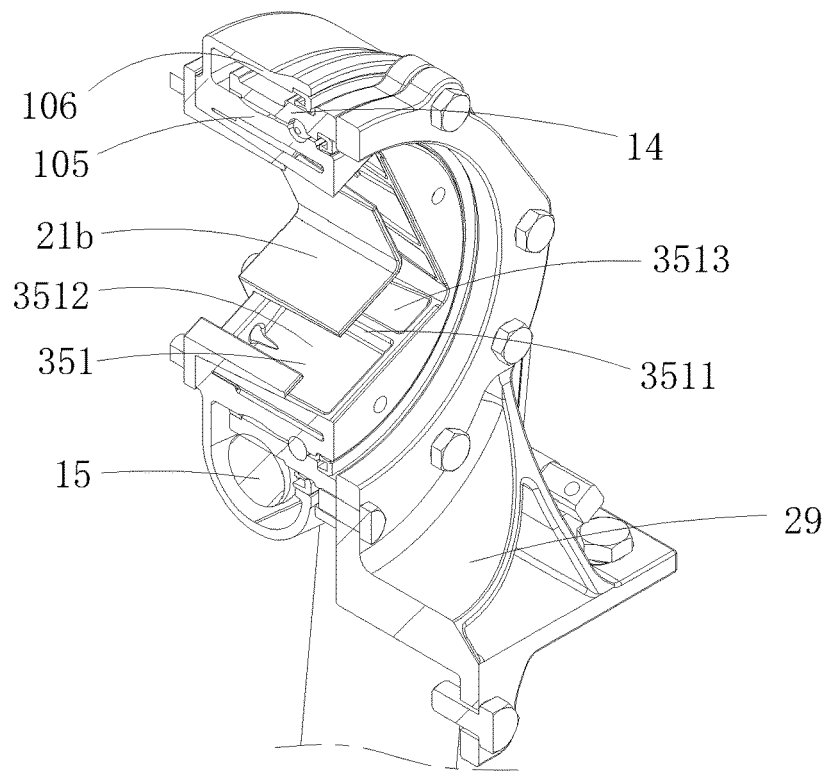
FIG. 53 is partial three-dimensional sectional view of FIG. 51.
Figure 54:
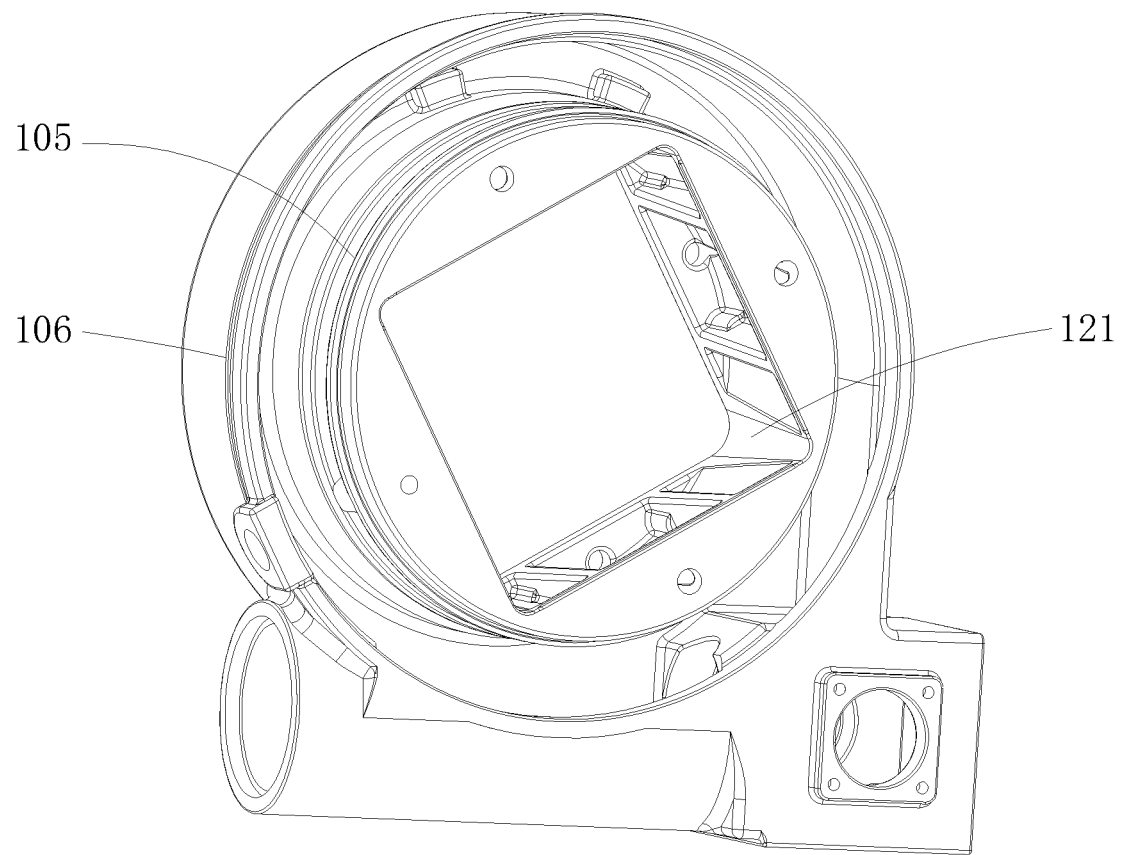
FIG. 54 is a perspective view of a shell in FIG. 51.
Figure 55:
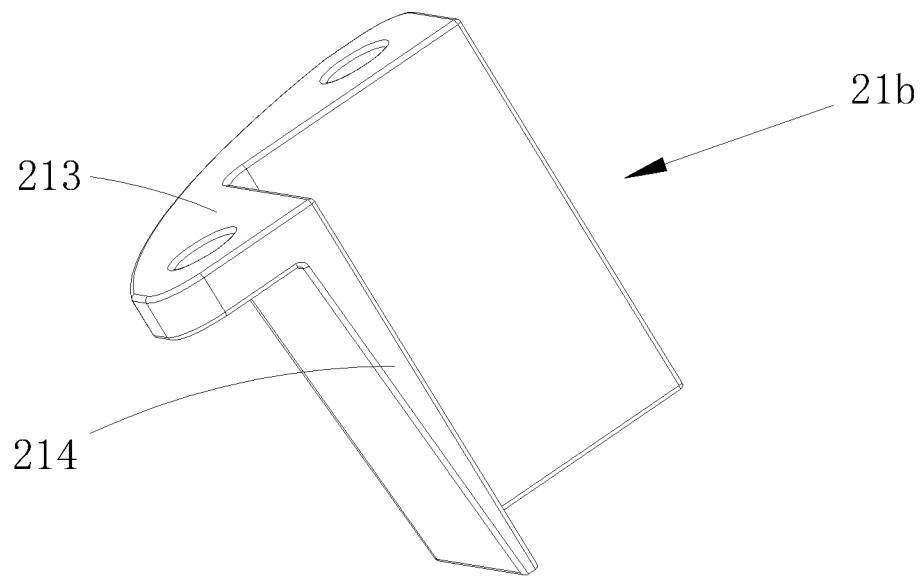
FIG. 55 is a perspective view of a retaining member in FIG. 51.

Further, as shown in FIGS. 53 and 54, the inner wall of the mounting hole 121 is provided with a plurality of reinforcing plates 1211 in the length direction. When the connecting portion 214 is connected to the shell, the outer edge of the flanged portion 213 is pressed against and is fit to the reinforcing plate 1211; the inner wall of the mounting hole 121 is further provided with a first weight-reducing groove 1212 and a second weight-reducing groove 1213 to reduce the weight of the shell. The first weight-reducing groove 1212 is formed between two reinforcing plates 1211 on the inner wall of the same mounting hole 121, the second weight-reducing groove 1213 is provided between the reinforcing plate 1211 and the inner wall of the mounting hole 121.

Referring to FIG. 53 and FIG. 54, in some embodiments, the shell is provided as a chimney structure, and the shell is provided with an inner layer 105 and a peripheral 106. The worm gear is partially inserted between the inner layer 105 and the periphery 106; the inner layer 105 and the periphery 106 are provided on the shell, and the inner layer 105 is directly and rotatably connected to the worm gear 14, thereby connecting the shell and the worm gear 14, reducing intermediate transmission links, making the slewing reducer 30 to be compact, improving the assembly efficiency and reducing the production cost.

Figure 56:
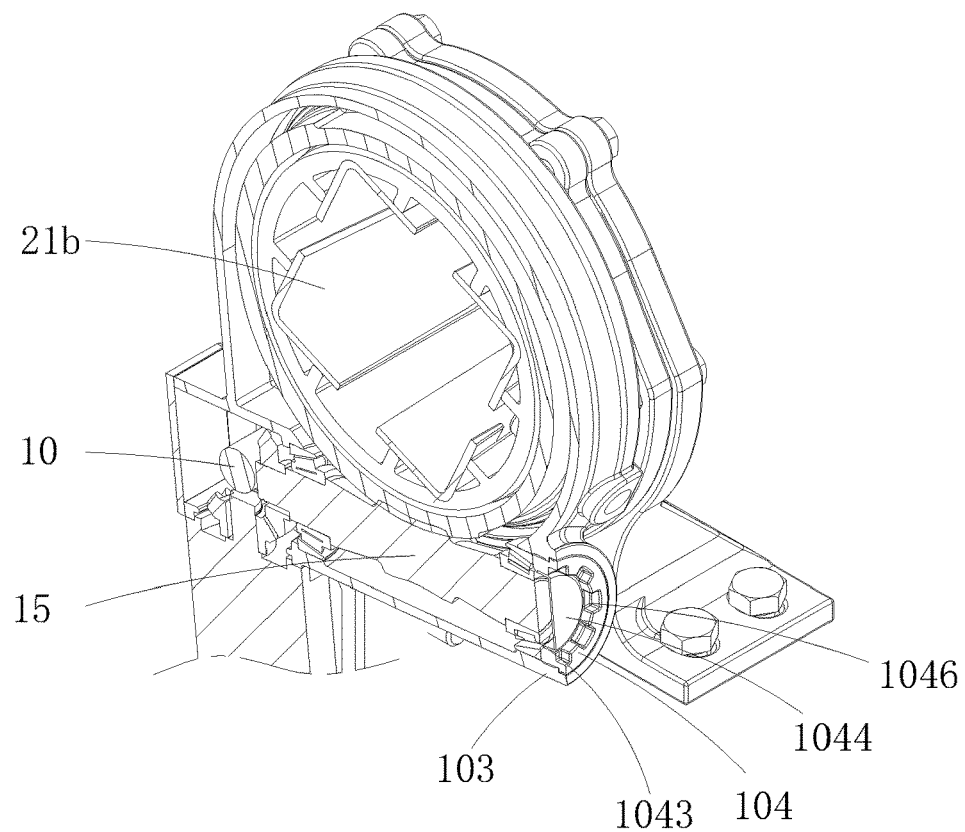
FIG. 56 is a three-dimensional sectional view of another part in FIG. 51.
Figure 57:
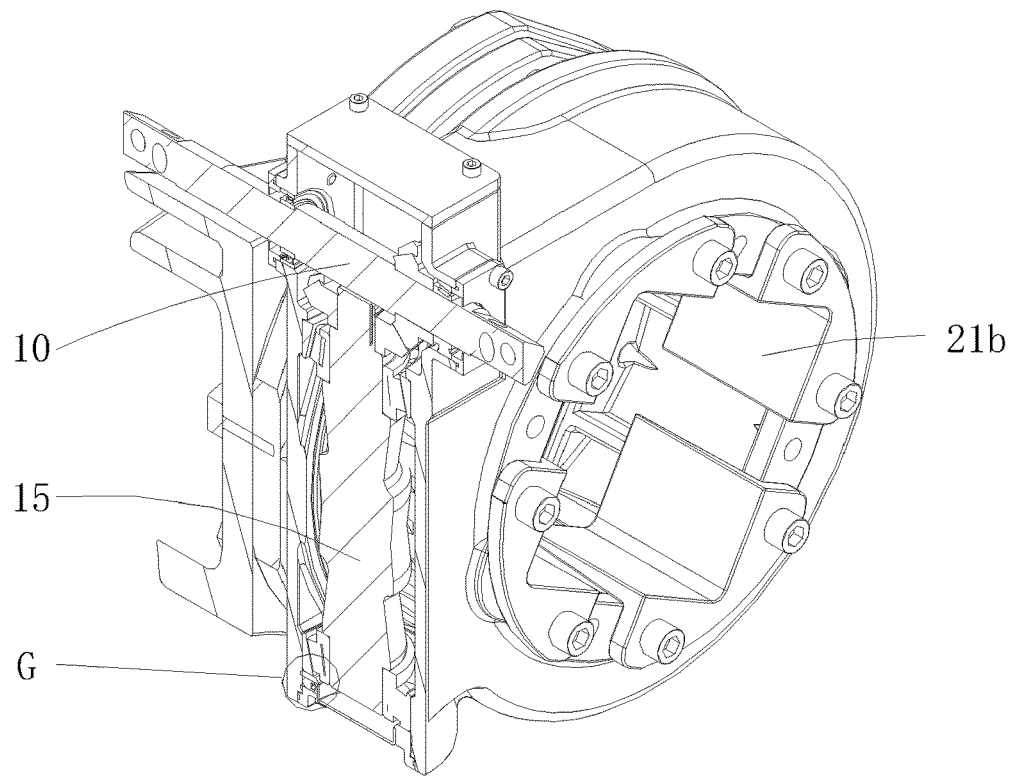
FIG. 57 is a three-dimensional sectional view of FIG. 51.
Figure 58:
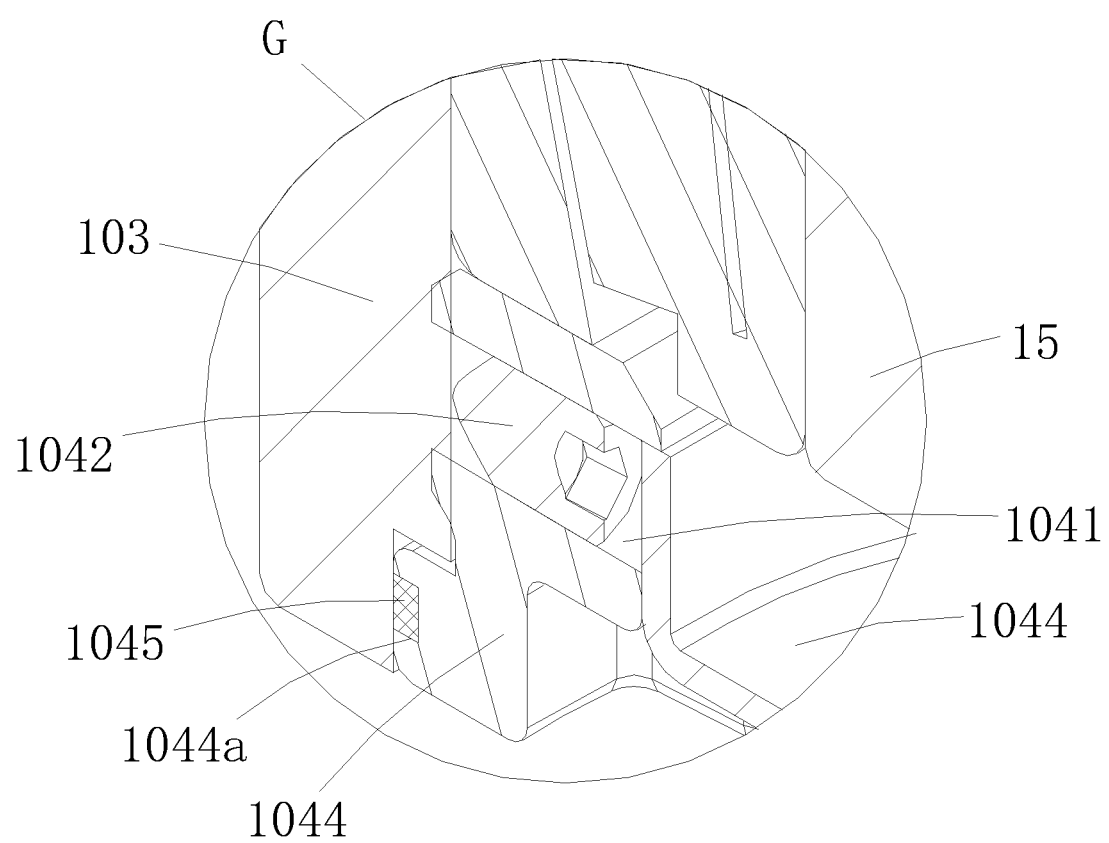
FIG. 58 is an enlarged view at C in FIG. 57.

As shown in FIGS. 56 to 58, in some embodiments, the shell is provided with a mounting boss 103, and the mounting boss 103 is screwed with a locking cover 104, which is convenient for observing the operation of the bearing, and one end of the locking cover 104 abuts against the bearing at the end portion of the worm 15; the locking cover 104 is provided with a plurality of positioning holes 1041 in the radial direction. After the locking cover 104 is mounted in place, a set screw 1042 is mounted inside the positioning hole 1041 and connected to the shell, avoiding the movement of the locking cover 104 during the operation of the driving mechanism. A through-hole 1043 is provided in the middle of the locking cover 104, and a sealing cover 1044 is provided disassembly in the through-hole 1043. The sealing cover 1044 is easy to disassemble to facilitate the lubrication of the bearing at the end portion of the worm 15 and facilitate the observation of operating conditions; The locking cover 1044 is provided with a sealing groove 1044a, and the sealing groove 1044a is provided with a sealing ring 1045 to seal the gap between the locking cover 104 and the mounting boss 103. When the locking cover 104 is mounted in place, the end face of the locking cover 104 is flush with the end face of the mounting boss 103. In addition, the end of the locking cover 104 facing away from the worm 15 is arranged with a plurality of locking grooves 1046 around the through-hole 1043, which need to be adapted with key to match with the locking grooves 1046 to rotate the locking cover 104, and prevent unrelated persons from opening or closing at will, increasing the degree of safety.

Figure 51:
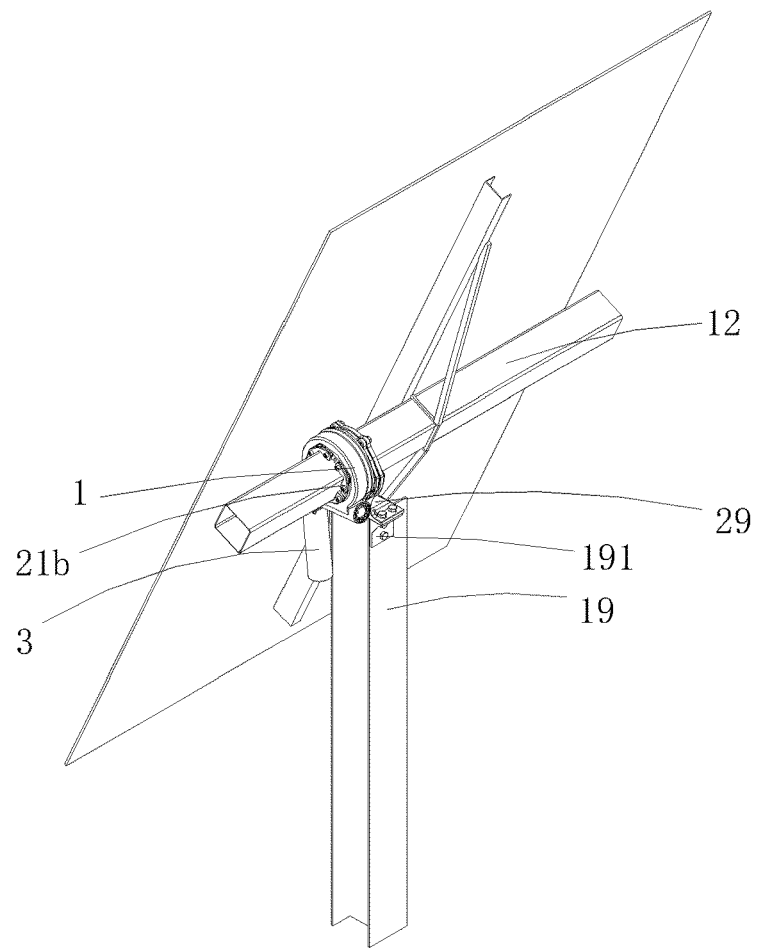
FIG. 51 is a schematic view of the third embodiment of a retaining member of the present invention.
Figure 52:
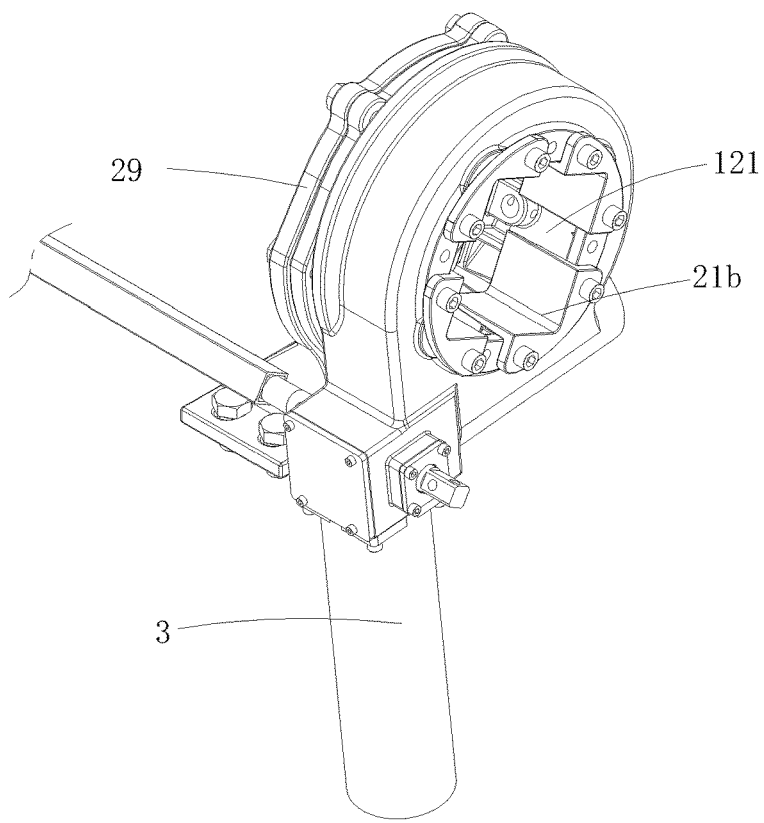
FIG. 52 is partial perspective view of FIG. 51.

As shown in FIG. 51 and FIG. 59, in some embodiments, the shell is fixed on column 19 through a mounting base 29, and a support 191 is symmetrically provided on both sides of the column 19. The support 191 is provided in an L shape.

One side is detachably connected to the column 19, and the other side is flush with the top surface of column 19 to form a mounting plane. The two supports 191 and column 19 jointly support the mounting base 29 to improve the stability of the mounting base 29; the connecting surface of the mounting base 29 and the support 191 is provided with a first strip hole 291. The fastening bolt passes through the first strip hole 291 and is connected to the support 191. The position of the mounting base on the support 191 can be adjusted appropriately through the first strip hole 291; the mounting base 29 is provided with an extension portion 292 in the length direction of the column 19, and the extension portion 292 is fit to the column 19 and is connected by fastening bolts to improve the stability of the mounting base 29. In addition, the extension portion 292 is provided with a second strip hole 293, and the fastening bolt partially penetrates the second strip hole 293, so as to prevent the fastening bolt from affecting the displacement of the mounting base 29.

Any embodiment of the present invention can be used as an independent technical solution, or can be combined with other embodiments.

The above description shows and describes the basic principles and main features, and advantages of the present invention. For those skilled in the art, it is obvious that the present invention is not limited to the details of the above exemplary embodiments, and can be realized in other specific forms without departing from the spirit or basics of the present invention. Therefore, from any point of view, the embodiments should be regarded as exemplary and non-restrictive. The scope of the present invention is defined by the appended claims rather than the above description. Therefore, it is intended that all changes falling within the meaning and scope of equivalent elements of the claims are included in the present invention. Any reference signs in the claims should not be regarded as limiting the claims involved.

In addition, it should be understood that although this description is described in accordance with the embodiments, not each embodiment only includes an independent technical solution. The narration in the description is only for clarity, and those skilled in the art should regard the description as a whole. The technical solutions in the various examples can also be appropriately combined to form other embodiments that can be understood by those skilled in the art.

What is claimed is:

1. A solar tracker, comprising a main beam and at least one slewing reducer, one of the at least one slewing reducer is connected to a motor, the motor is controlled by a motor controller, and the motor controller is connected to the motor by a cable; wherein the one of the at least one slewing reducer that is connected to the motor is a driving slewing reducer, and other slewing reducers are driven slewing reducers, a torque of the driving slewing reducer is transmitted to the driven slewing reducers through a transmission shaft, and the driving slewing reducer and the driven slewing reducers rotate synchronously to drive the main beam to rotate; the main beam is provided through an interior of the at least one slewing reducer;

wherein the main beam is sleeved with a rotating shaft, and the rotating shaft engages with a worm gear through a rolling bearing;

wherein the main beam is connected to the rotating shaft and a shell through a retaining member;

wherein the retaining member is provided with a convex ring extending outwardly in an axial direction, a first inclined plane is arranged on an outer wall of the convex ring from top to bottom, a second inclined plane is arranged on an inner wall of the rotating shaft and the shell of the at least one slewing reducer from bottom to top, and the first inclined plane can move left and right along the second inclined plane.

2. The solar tracker according to claim 1, wherein the retaining member is provided with a truncated cone extending outwardly in a radial direction, the truncated cone is provided with a first locking hole, both the rotating shaft and the shell of the at least one slewing reducer are provided with a second locking hole, and the first locking hole is in anti-rotation engagement with the second locking hole through a locking member.

3. A solar tracker, comprising a main beam and at least one slewing reducer, one of the at least one slewing reducer is connected to a motor, the motor is controlled by a motor controller, and the motor controller is connected to the motor by a cable; wherein the one of the at least one slewing reducer that is connected to the motor is a driving slewing reducer, and other slewing reducers are driven slewing reducers, a torque of the driving slewing reducer is transmitted to the driven slewing reducers through a transmission shaft, and the driving slewing reducer and the driven slewing reducers rotate synchronously to drive the main beam to rotate; the main beam is provided through an interior of the at least one slewing reducer;

wherein the main beam is sleeved with a rotating shaft, and the rotating shaft engages with a worm gear through a rolling bearing;

wherein the main beam is connected to the rotating shaft and a shell through a retaining member;

wherein a first inclined plane is arranged on an outer wall of the retaining member from top to bottom, and an inner wall of the rotating shaft is provided with a plurality of stiffeners extending inwardly in a circumferential direction, a second inclined plane is arranged on the inner walls of the plurality of stiffeners from bottom to top, and the first inclined plane can move left and right along the second inclined plane.

4. The solar tracker according to claim 3, wherein the retaining member is provided with a boss extending outwardly in a radial direction, the boss is provided with a first locking hole, both the rotating shaft and the shell of the at least one slewing reducer are provided with a second locking hole, and the first locking hole is in anti-rotation engagement with the second locking hole through a locking member.

5. The solar tracker according to claim 1, wherein a shape of the inner wall of the retaining member is same as the shape of the outer wall of the main beam.

6. A single main beam multi-point driving solar tracking system, comprising a main beam and at least one slewing reducer, one of the at least one slewing reducers is connected to a motor, and the motor is controlled by a motor controller, and the motor controller is connected to the motor by a cable; wherein the one of the at least one slewing reducer that is connected to the motor is a driving slewing reducer, and other slewing reducers are driven slewing reducers, a torque of the driving slewing reducer is transmitted to the driven slewing reducers through a transmission shaft, and the driving slewing reducer and the driven slewing reducers rotate synchronously to drive the main beam to rotate; the at least one slewing reducer and the transmission shaft are rotatably provided with the main beam synchronously in same direction;

wherein a shell of the at least one slewing reducer is provided with a first connecting column and a second connecting column, and the main beam on a left side of the at least one slewing reducer is connected to the first connecting column, the main beam on a right side of the at least one slewing reducer is connected to the second connecting column; the second connecting column and the shell are an integral structure, and the first connecting column is detachably connected to the second connecting column.

7. The single main beam multi-point driving solar tracking system according to claim 6, wherein the at least one slewing reducer is a worm gear slewing reducer, a worm gear of the at least one slewing reducer is fixedly arranged on the column, and the shell of the at least one slewing reducer is fixedly connected to the main beam, the worm gear rotatably engages with the shell; when the motor is started, a worm rotates around the worm gear while revolving to drive the at least one slewing reducer and the main beam to rotate.

8. The single main beam multi-point driving solar tracking system according to claim 6, wherein the transmission shaft is provided with a plurality of connecting members spaced apart in a length direction, and each connecting member is connected to the main beam.

9. The single main beam multi-point driving solar tracking system according to claim 8, wherein one end of each connecting member is sleeved on the transmission shaft, and the other end is sleeved on the main beam, the transmission shaft is provided with a bearing at a connection point, and the main beam is provided with a frame and a fastener at the connection point.

10. The single main beam multi-point driving solar tracking system according to claim 7, wherein a connecting plate is provided on the column, and a connecting portion connected to the connecting plate is provided on the worm gear.

11. The single main beam multi-point driving solar tracking system according to claim 7, wherein a rolling bearing assembly and a sliding bearing assembly are provided between the worm gear and the first connecting column, and the rolling bearing assembly comprises an inner ring, an outer ring, and a plurality of balls arranged between the inner ring and the outer ring, the inner ring is formed on the first connecting column, and the outer ring is formed on the worm gear.

12. The single main beam multi-point driving solar tracking system according to claim 11, wherein the sliding bearing assembly comprises a first sliding portion and a second sliding portion, and the first sliding portion is formed on the second connecting column, the second sliding portion is formed on the worm gear.

13. The single main beam multi-point driving solar tracking system according to claim 7, wherein one end of the worm is externally sleeved with a first bevel gear and a transmission gear, and a motor output end is provided with a first gear meshing with the transmission gear, the transmission shaft is externally sleeved with a second bevel gear, and the first bevel gear meshes with the second bevel gear.

* * * * *